(12) United States Patent
Povsner

(10) Patent No.: US 12,499,425 B2
(45) Date of Patent: Dec. 16, 2025

(54) SECURITY MECHANISMS FOR DIGITAL CURRENCIES

(71) Applicant: NATIONAL CURRENCY TECHNOLOGIES, INC., Ashburn, VA (US)

(72) Inventor: Joshua M. Povsner, Ashburn, VA (US)

(73) Assignee: NATIONAL CURRENCY TECHNOLOGIES, INC., Ashburn, VA (US)

( * ) Notice: Subject to any disclaimer, the term of this patent is extended or adjusted under 35 U.S.C. 154(b) by 184 days.

(21) Appl. No.: 18/272,684

(22) PCT Filed: Feb. 9, 2022

(86) PCT No.: PCT/US2022/015855
§ 371 (c)(1),
(2) Date: Jul. 17, 2023

(87) PCT Pub. No.: WO2022/173856
PCT Pub. Date: Aug. 18, 2022

(65) Prior Publication Data
US 2024/0303614 A1  Sep. 12, 2024

Related U.S. Application Data

(60) Provisional application No. 63/304,684, filed on Jan. 30, 2022, provisional application No. 63/294,732, filed on Dec. 29, 2021, provisional application No. 63/240,964, filed on Sep. 5, 2021, provisional application No. 63/209,989, filed on Jun. 12, 2021, provisional application No. 63/173,631, filed on Apr.
(Continued)

(51) Int. Cl.
*G06Q 20/06* (2012.01)
*G06Q 20/38* (2012.01)

(52) U.S. Cl.
CPC ....... *G06Q 20/0655* (2013.01); *G06Q 20/389* (2013.01); *G06Q 2220/10* (2013.01)

(58) Field of Classification Search
CPC ............. G06Q 20/0655; G06Q 20/389; G06Q 2220/10
USPC ........................................................ 705/64
See application file for complete search history.

(56) References Cited

U.S. PATENT DOCUMENTS 11,823,180 B1 * 11/2023 Trinh ................... G06Q 20/382
2017/0053249 A1    2/2017 Tunnell et al.
(Continued)

OTHER PUBLICATIONS

International Search Report and Written Opinion dated May 17, 2022, for PCT No. PCT/US2022/015855, 8 pgs.

*Primary Examiner* — Courtney P Jones
(74) *Attorney, Agent, or Firm* — VOLENTINE, WHITT & FRANCOS, PLLC; Joshua M Povsner

(57) ABSTRACT

A centralized tracking system includes a security gateway system and a main memory system. The security gateway system interfaces with the public over the internet at an internet protocol address, and comprises a memory that stores packets received from the public over the internet and a processor that executes a plurality of algorithms to impose safety checks on each packet received from the public. The main memory system is shielded from the public by the security gateway system, stores records for the centralized tracking system, and receives updates to the records from the security gateway system once instructions from the public pass the safety checks.

15 Claims, 12 Drawing Sheets

Related U.S. Application Data

12, 2021, provisional application No. 63/148,335, filed on Feb. 11, 2021.

(56) References Cited

U.S. PATENT DOCUMENTS

| | | | |
|---|---|---|---|
| 2018/0268382 A1* | 9/2018 | Wasserman | H04L 9/3247 |
| 2020/0153793 A1 | 5/2020 | Kikinis et al. | |
| 2021/0182804 A1* | 6/2021 | Tavanez | G06Q 20/02 |
| 2022/0083988 A1* | 3/2022 | Lynberg | G06Q 20/389 |

* cited by examiner

| HEADER 24 | | | VN COUNT 8 | VN ORIGIN ID 8 | FIRST PARTY ID 8 | SECOND PARTY ID 8 | VN #1 ID 8 |
|---|---|---|---|---|---|---|---|
| VN #2 ID 8 | VN #3 ID 8 | VN #4 ID 8 | VN #5 ID 8 | VN #6 ID 8 | VN #7 ID 8 | VN #8 ID 8 | VN #9 ID 8 |
| VN #10-ID 8 | VN #11-ID 8 | VN #12-ID 8 | VN #13-ID 8 | VN #14-ID 8 | VN #15-ID 8 | VN #16-ID 8 | SFIOI TYPE 8 |
| ⋮ | | | | | | | |
| RESERVED FOR STATUS UPDATING 64 | | | | | | | |

SECURITY MECHANISMS FOR DIGITAL CURRENCIES

CROSS REFERENCE TO RELATED APPLICATIONS

This patent application claims priority to U.S. provisional application No. 63/148,335, filed Feb. 11, 2021, to U.S. provisional application No. 63/173,631, filed Apr. 12, 2021, to U.S. provisional application No. 63/209,989, filed Jun. 12, 2021, to U.S. provisional application No. 63/240,964, filed Sep. 5, 2021, to U.S. provisional application No. 63/294,732, filed Dec. 29, 2021, and to U.S. provisional application No. 63/304,684, filed Jan. 30, 2022, which are all herby incorporated by reference in their entireties.

BACKGROUND

National digital currencies (NDCs) are potentially useful to supplement or replace national physical currencies. Distributed ledger technology (DLT) has been studied in this context. DLT provides a consensus network in which copies of a ledger are maintained and updated at each independent node of the consensus network. When a question is raised as to a transaction, a consensus among the nodes decides the answer to the question. For a variety of reasons such as safety, DLT is not particularly appropriate for use in implementing NDCs. The inventor(s) of the subject matter described in this and related applications have therefore investigated how to realistically safely implement NDCs using centralized tracking.

BRIEF DESCRIPTION OF THE DRAWINGS

Example embodiments are best understood from the following detailed description when read in context with the accompanying drawing figures, in which.

DETAILED DESCRIPTION

In the following detailed description, for purposes of explanation and not limitation, representative embodiments disclosing specific details are set forth in order to provide a thorough understanding of the representative embodiments according to the present teachings. However, other embodiments consistent with the present disclosure may depart from specific details disclosed herein. Descriptions of known systems, devices, methods of operation and methods of manufacture may be omitted so as to avoid obscuring the description of the representative embodiments. Nonetheless, systems, devices and methods that are within the purview of one of ordinary skill in one or more of the numerous arts relevant to the present teachings are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

If centralized tracking is to be used to implement NDCs, numerous safety aspects must be addressed. A CS for tracking an NDC must interface with the public, and must be kept safe from every conceivable form of threat. There is a widespread belief in technological communities that nothing connected with the public over the internet can be considered safe. In other words, the CS must be accessible to any individual in the world with an internet connection, but must be able to filter or reject every conceivable threat presented by any individual in the world with an internet connection. One aspect of safety that can be used as a starting point to challenge this belief is for governments to define what can be accepted by a CS, and take measures to block and delete anything outside of what is defined to be acceptable.

Figure 1A:
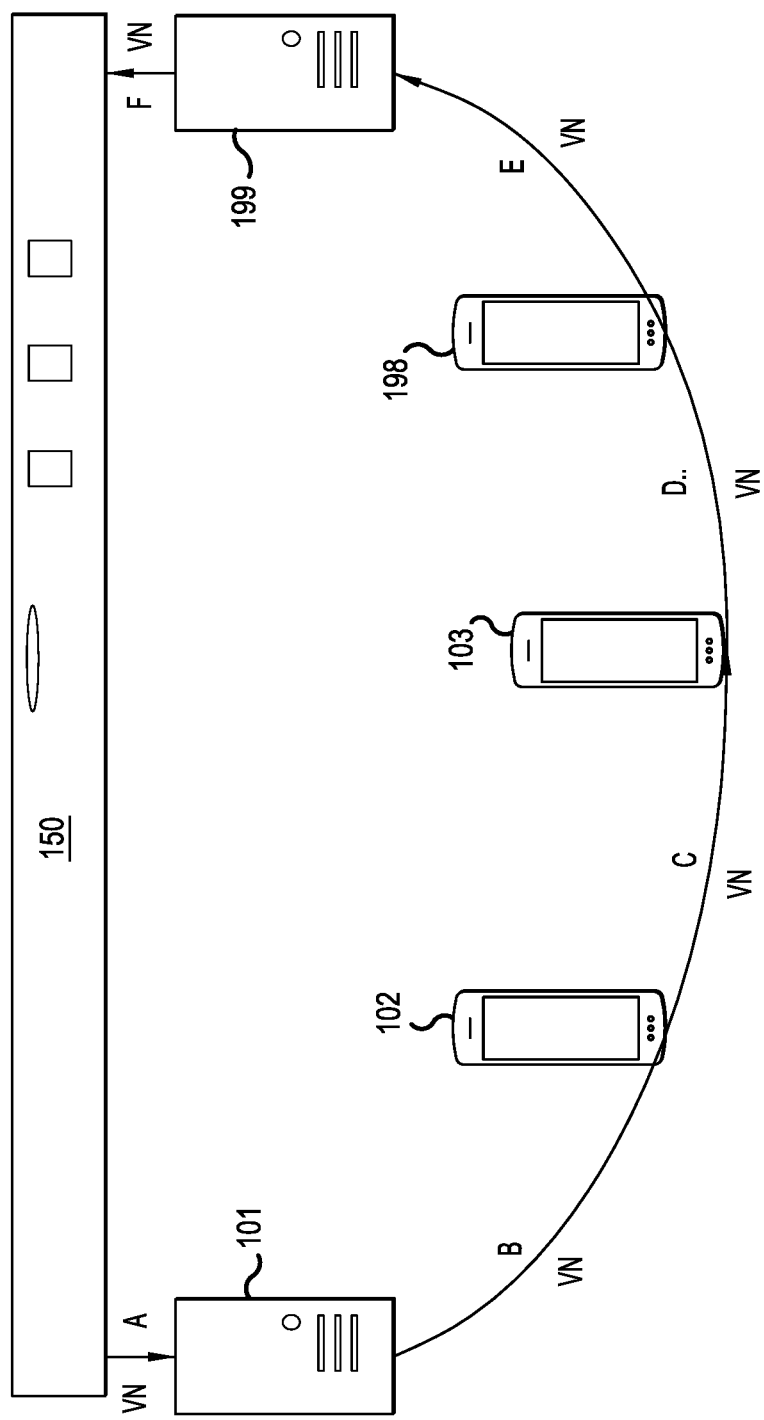
FIG. 1A illustrates a lifecycle overview for NDCs.

In a lifecycle overview for NDCs shown in FIG. 1A, a virtual note (VN) is transferred between a CS 150 and an electronic communication device (ECD) controlled by a party at step A, such as to initially assign the VN to a financial institution after creating the VN. VNs of an NDC may be defined data sets that are each assigned a unique identification, a denomination and a source of the VN, though other information may also be included. The CS 150 and any other CS described herein is a centralized tracking system. The VN is then transferred between multiple ECDs controlled by different parties (device 101, device 102, device 103, and device 104) at steps B, C, D and E. The VN is then provided back to the CS 150 at step F such as to retire the VN temporarily or permanently. Devices used to communicate VNs (e.g., device 101, device 102, device 103, and device 104) are ECDs such as computers or cell phones. VNs may be packetized and communicated over packet-switched networks that switch packets in accordance with transmission control protocol/internet protocol (TCP-IP) and/or user datagram protocol (UDP-IP). The CS 150 in FIG. 1A may create, distribute, track and/or retire the VN.

Figure 1B:
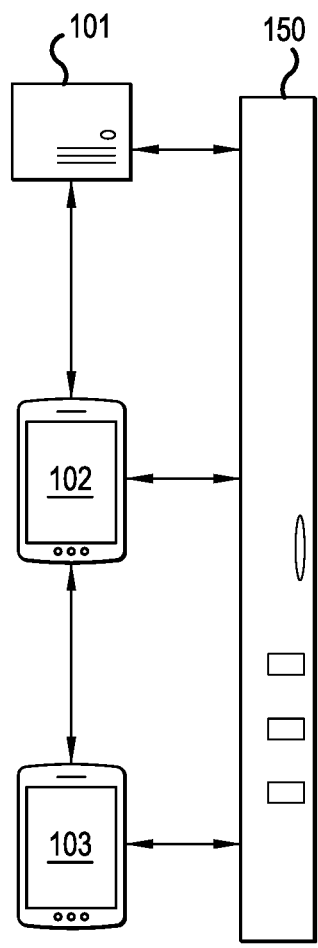
FIG. 1B illustrates tracking NDCs.

In tracking NDCs shown in FIG. 1B, transaction requesters and/or transaction counterparties send short, formatted inquiries and instructions (SFIOIs) to the CS 150 to inquire as to ownership of VNs or to provide instructions to transfer ownership of VNs. For example, a transaction counterparty may proactively verify with the CS 150 that a transaction requester owns a VN, and the CS 150 may transfer VNs based on instructions in SFIOIs. The format for the SFIOIs is defined by the source of the VNs. Using a predefined format, ECDs used by the public will be able to ensure compliance, and packets of SFIOIs may be pre-filtered before the packets are received at the internet protocol address for the security gateway system 156 and post-filtered by algorithms run at the security gateway system 156 to ensure that the packets meet the predefined format.

The CS 150 may generate and send multi-factor push notifications to ECDs in order to confirm transfers or inquiries purportedly initiated by the ECDs. An ECD initiating a transaction or a transfer notification is expected to be on and in the hands of the transaction requester, such that multi-factor authentication can be reasonably expected in real time by the transaction requester. Transaction requesters may be separately notified by the CS 150 to provide or confirm assent to the transfer of the VN only if they are the owners of record, since notifications may be provided to communications addresses of record for the owners of record. In some embodiments, transaction counterparties may verify with a CS that a transaction requester is the owner of a VN without the CS confirming with the transaction requester that the VN will be transferred, such as if transaction requesters provide verification information to the transaction requesters uniquely identifying the transaction requesters. The counterparties may present the verification information to the CS 150 so that the CS 150 can assume that the transaction requesters have assented to transfer the VN since there is a very low risk that a counterparty can guess that any particular party is the owner of record for any particular VN, and the CS 150 may impose strict penalties for inaccurate SFIOIs.

SFIOIs may be sent to a predetermined hostname or IP address for the CS 150. Transfer of VNs may be reported to the CS 150 by either or both of the transaction requester when the VN is sent and by the counterparty when the VN is received.

Greylists may be maintained for VNs for a variety of reasons including frequency of transference by a transaction requester, frequency of activity (e.g., handling of many VNs) by a transaction requester, and many other reasons. Greylists may also be maintained for parties such as transaction requesters who are subject to extraordinary monitoring. In some embodiments, a transaction requester may be prevented from recapturing ownership of a VN for a predetermined minimum number of intervening different owners such as two or five, or within a predetermined time frame such as forty eight hours after transferring ownership of the VN away.

One way to ensure compliance with requirements for proper formatting of SFIOIs is to use authorized currency reader applications and/or electronic wallet programs. Instances of authorized currency reader applications and/or electronic wallet programs may be provided with unique identifications maintained in association with unique identifications of parties in records at the CS 150.

Figure 1C:
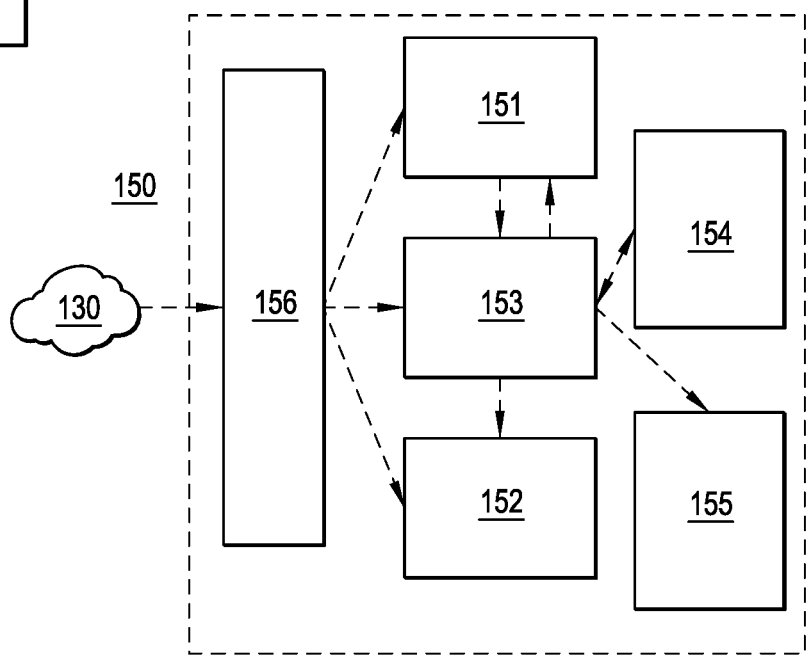
FIG. 1C illustrates a central system (CS) for tracking NDCs.

In the CS for tracking NDCs illustrated in FIG. 1C, a security gateway system 156 is used as an interface between the public and other elements of the CS 150. The CS 150 includes the security gateway system 156, an ID management system 151 (identification management system), a LSS 152 (ledger storage system), a main memory system 153, an artificial intelligence and analytics system 154, and a backup memory system 155. The arrows in FIG. 1C show that in some cases, communications between elements of the CS 150 may be mostly or entirely restricted to one-way communications. In embodiments based on FIG. 1C, communications from at least the public may be restricted to the security gateway system 156. Intermediary service providers that have large customer bases who want to send encrypted communications may be allowed access to a closely-located facility adjacent to the security gateway system 156, so that propriety encryptions can be provided to endpoints at the closely-located facility and then decrypted and fed directly to the security gateway system 156.

The ID management system 151 may be used to store and update records for parties authorized to use the NDC tracked by the CS 150.

The LSS 152 is used to maintain records of current ownership of all VNs tracked by the CS 150. The LSS 152 is used to address ownership inquiries from the public once inquiries in SFIOIs pass security checks at the security gateway system 156. The LSS 152 is updated from the main memory system 153 when VNs are transferred via SFIOIs. The LSS 152 may be used to quickly track and verify ownership of a VN by hierarchically storing records for VNs in alphabetical order, numerical order, or alphanumeric order. In this way, a record for a VN can be looked up using the unique identification of the VN. The record in the LSS 152 may include only the most recent owner of the VN. Using the LSS 152, the CS 153 stores records of current ownership of each instance of a tracked digital asset (e.g., the VNs of the NDC). In some embodiments, the security gateway system 156 may confirm ownership of VNs listed in SFIOIs with the LSS 152 in all, or almost all cases, insofar as confirming that the sender of a SFIOI has accurate knowledge of ownership of all VNs listed in the SFIOI may always, or almost always, be an important safety check for the SFIOI.

The main memory system 153 includes one or more databases, solid state storages (SSDs), and/or other forms of memory appropriate for storing millions, billions and even trillions of data items such as unique identifications for VNs, for electronic wallet programs, for currency reader programs, for parties, for ECDs and so on. The artificial intelligence and analytics system 154 applies artificial intelligence and analytics to the data items in the main memory system 153. For example, the artificial intelligence and analytics system 154 may be configured to obtain and analyze records for VNs from the data items stored in the main memory system 153. The backup memory system 155 stores a backup of the records at the main memory system 153. More than one backup memory system 155 may be provided for the main memory system 153 and one or more backup systems (not shown) may be provided for the LSS 152. The security gateway system 156 serves as the only interface with the public for the CS 150 in FIG. 1C.

The CS 150 provides numerous internal safety measures. For example, the LSS 152 is effectively isolated or at least isolatable from the ID management system 151. The main memory system 153 and the ID management system 151 may communicate by one-way communications without interacting, or with minimal interaction. The artificial intelligence and analytics system 154 may be provided access only to the main memory system 153, entirely closed off from the public, and only available to authorized government officials and authorized researchers. The backup memory system 155 may also be entirely closed off from the public in normal operations, though if the backup memory system 155 is switched on, updates to the main memory system 153 may instead be provided to the backup memory system 155, and interactions between the main memory system 153 and other elements of the CS 150 may be switched to the backup memory system 155. The main memory system 153 and/or the backup memory system 155 may be physically protected such as by being implemented in private data centers that are underground, shielded from electromagnetic pulses (EMPs) and so on. Updates to equipment in the main memory system 153 and the backup memory system 155 may be limited to updates performed locally, and the main memory system 153 and the backup memory system 155 may be entirely disconnected from the public except insofar as they can be used to store records for VNs based on instructions provided via SFIOIs processed by the security gateway system 156.

The number of VNs specifiable in any SFIOI may be limited, such as to nine. SFIOI formatting may also limit the data size of SFIOI to a specific size such as 512 bytes. The security gateway system 156 may also implement anti-spoofing measures via outgoing communications. For example, the security gateway system 156 may initiate generation of a small code to send with any multi-factor authentication check used to confirm transfer instructions. A small code may be sent with a message to the communication address of record of the owner or for display on a pop-up window on a device corresponding to the communication address of record of the owner. The owner may be required to manually return the small code, such as two characters, to confirm the transfer. In this way, even if spoofers know that anti-spoofing messages are sent and plan to spoof a response to the anti-spoofing messages, the spoofers may be blocked when they cannot guess the characters which are dynamically generated and sent by the security gateway system 156.

The security gateway system 156 may provide access through dedicated and/or otherwise secure lines or communication channels or even one or more call centers to law enforcement agencies, post offices, bank and similar entity systems, and other government offices such as offices of secretaries of states in the U.S. The security gateway system 156 function as a controlled access point with the only internet protocol addresses published to the public for the CS 150, and otherwise limit any access to the other elements of the CS 150 so that there is no direct public access to the other elements. The security gateway system 156 serves a function of shielding the main memory system 153 and other components of the CS 150 from the public. Communications that do not meet specific formats for the SFIOIs may be discarded without exception.

The security gateway system 156 may execute complex software that systematically performs comprehensive safety checks on SFIOIs received at the CS 150. The software capable of performing comprehensive safety checks for a security gateway system 156 is able to quickly and efficiently process enormous volumes of proper SFIOIs and detect and delete anything else. A full set of flexible software sub-applications may be adapted to any of a variety of formats set for SFIOIs used in any CS identical or similar to those described herein. Each of the software sub-applications includes instructions for different algorithms that each perform a different task or different tasks then other of the software sub-applications. In other words, each of the software sub-applications is dedicated to a unique and different task relative to the other software sub-applications. No sub-application or core of a multi-core processor executes or processes the entirety of any packet for a SFIOI, and instead the sub-applications process different parts of each packet. The software sub-applications may be provided as a software program or as pre-programmed special-purpose multi-core processors that implement the software program. Several types of software sub-applications may be provided as a safety program for the security gateway system 156, and are able to detect different types of corruptions of SFIOIs so that the corrupted SFIOIs are detected and not processed in the same manner as uncorrupted SFIOIs.

A mandate of 512 bytes or another size for a packet compliant with a SFIOI format provides several types of safety. For example, a security gateway system 156 may check one field to ensure that the source ID for a VN corresponds to the provider of the security gateway system 156. For another, a security gateway system 156 may check that each VN specified in a SFIOI actually belongs to the party #1 identified in the SFIOI as the purported owner. The security gateway system 156 may check to ensure that null fields are null, that header information such as a hop count is exactly what is expected (e.g., 0), and that fields allocated for one or more VNs meet expectations (e.g., #8 and #9 are null if the VN count specifies that no such VNs are identified in the SFIOI).

32 bits (4 bytes) is more than enough to uniquely identify the U.S. population with unique identifications for NDCs. 8 bits (1 byte) is more than enough to uniquely identify each individual nation with a unique identification for NDCs. 16 bits (2 bytes) is more than enough to uniquely identify each bank or similar entity in the U.S. with a unique identification for NDCs. Unique party identifications may be obtained through financial institutions such as a bank or similar entity. The unique identification of the bank or similar entity may be part of the unique identification for a party. Unique party identifications assigned by banks or other entities may require more than 4 bytes, such as 5 bytes, to accommodate banks or other entities with very large customer bases over ½ million. One benefit of having banks of similar entities assign unique party identifications for NDCs is that profiles for the parties may be retained at the banks or similar entities rather than at the CS 150. Similarly, unique party identifications for NDCs for unbanked individuals may be provided through local branches of national postal services. Branches of national postal services may be provided with digital fingerprint pads which can be used by any individual with a finger to uniquely identify themself. The postal services may confirm existing identities using the digital fingerprint pads, and may send the unique party identifications to the ID management system 151 while retaining the fingerprint, name, and/or other information provided by an unbanked party.

The processing environment of a security gateway system 156 may logically store voluminous pre-filtered SFIOIs in flash memory pages on a 1-to-1 basis 24/7/365. A set of coordinated software safety sub-applications may be executed by a single multi-core processor in the security gateway system 156 on SFIOIs which reach the security gateway system 156. The safety sub-applications may run on the SFIOIs stored in the flash memory pages in a FIFO sequence. Each safety sub-application performs its assigned type of safety process in the same manner on each SFIOI it is authorized to process. Processing for each page is highly coordinated by staggering the safety sub-applications to run in a predetermined order on each page until all safety sub-applications are finished with their processing of the SFIOI on the page.

Safety for the CS 150 may also be ensured by refusing any incoming connection requests at the security gateway system 156, and only accepting individual packets. For example, the CS 150 may not accept any type of incoming connection request, and such connection requests may be blocked at network routers in the internet before they reach the CS 150. Additional safety mechanisms may be provided for the CS 150. For example, a published IP address may be provided for interfacing with the public without providing any domain for the SFIOIs to reach the security gateway system 156, as this may help to entirely avoid domain hijacking. The security gateway system 156 may only receive and accept individual, non-sequential SFIOIs, such as UDP/IP packets, and may not accept or establish any incoming connections such as from TCP/IP packet sequences, so as to help thwart DOS attacks. Moreover, SFIOI requirements may set a maximum number (e.g., 9) of VNs which can be specified in any single SFIOI.

SFIOIs and the technology of the CS 150 including the security gateway system 156 may also be used for other purposes, such as to update travel records for passport holders and to track other types of information such as ownership of real property and corresponding mortgages, ownership of automobiles and corresponding auto loans, ownership of digital entertainment and computer software, DRM corresponding to digital entertainment and computer software, and ownership of shares in private businesses and corresponding debts of the private businesses.

The security gateway system 156 for the CS 150 may include multiple nodes, and every node may be able to process tens of thousands (e.g., 40,000 or more) of legitimate SFIOIs per minute. Safety sub-applications described herein may be adjustable to handle uniform formats specifying data sizes other than 512 bytes or 256 bytes. Incoming SFIOIs may be stored at sequential address spaces in uniform memory units such as 512 bytes (i.e., flash memory pages). The last few (e.g., 8) words in each SFIOI may be required to be null and not written to the flash memory pages.

The set of safety sub-applications perform different safety processes on each received SFIOI as a condition to responding to any inquiry or executing any instruction. Each safety sub-application only processes one or more specific byte(s) at the same relative location(s) of each page to perform its function, and does not process byte(s) where no substantive data is expected unless it is tasked to confirm the absence of substantive data.

The processing at the security gateway system 156 may be visualized as 4-dimensional processing. The 512-byte pages are 2-dimensional memories with 64 64-bit word lines. Each safety sub-application incrementally moves between pages in a third dimension and processes the same byte(s) or word(s) on each page. The safety sub-applications are staggered in time as a fourth dimension, so that safety sub-applications avoid collisions trying to read from or write to the same byte(s) or word(s) at the same time. Additionally, the ownership checks for the fourth type of safety sub-applications necessarily involve a timing offset as the one set of cores sends pairs to the LSS 152, and the other set of cores processes the responses from the LSS 152 to avoid any core sending a pair and then being hung up waiting for a response.

A status update system may use the same memory pages as are used for storing the SFIOIs. The status update system is used to synchronize the safety sub-applications as they process the voluminous SFIOIs. Tracking for an NDC may require enormous numbers of write cycles to the memory used to store the SFIOIs. If the same memory cells, or even the same type of memory cells, are used to update statuses 10 to 20 times during processing of each SFIOI, the number of write cycles to the status memory cells would be many times the number of write cycles to the memory cells used for storing the SFIOI. This would mean that the overall memory may be fatigued much quicker when the status memory cells become fatigued. For example, 8 64-bit (8 byte) processing words at the end of the 512-byte SFIOIs may be mandatorily null, not written to the page, and the corresponding memory cells in the memory page may be used for status updates instead of any substantive data in the SFIOIs. In other words, the SFIOIs may be stored on a 1-to-1 basis on 512-byte pages at the security gateway system 156, but without writing, for example, the 8 64-bit null processing words at the end of the SFIOIs to the pages. Instead, the memory cells at the end of the pages may be used for tracking statuses of the safety sub-applications so that the safety sub-applications can check the appropriate status word/byte before performing their safety process on a SFIOIs, and can each update a different status word/byte after performing their safety process. The functionality of the status checks and status updates may be part of each safety sub-application. The status update system ensures that status updates may be written at effectively the same rate as the memory cells used for storing the substantive data of the SFIOIs, and this may extend the memory life by at least 1000% compared to repeatedly writing status updates to the same byte(s) for status updates 10 or more times during processing of each SFIOI.

Requiring proof that the purported owner specified in each SFIOI is the actual owner may be a key safety measure, even though avoiding hang-ups waiting for a response from the LSS 152 may be the key reason, or one of the key reasons, that all safety processes are not implemented linearly by stand-alone cores of a multi-core processor. Other hang-ups may be mandated when checks are made for owner-specific handling instructions, blacklists and greylists, and more.

The 64 words of a 512-byte SFIOI for an IPV4 packet may include at least: 3 words for the IP header (20 bytes+4 null bytes); 9 words for identifying VNs; 2 words for identifying parties; 1 word for identifying a national/regional origin of the VNs; 1 word for specifying the number of VNs purportedly identified in the SFIOI; 1 word for specifying the type (purpose) of the SFIOI; 8 words at the end are mandatorily null and may correspond to the memory space at the end of the pages used for status updates during processing of SFIOIs. Other words may be null. A 24-core/48-thread (e.g., AMD) processor is an example of the type of multi-core processor appropriate for the security gateway system 156, so 8 processing words (64 bytes) provide more than enough bytes to dedicate on a 1-1 or better basis for each thread to update when the process implemented for the SFIOI by the thread is complete.

Hundreds or even thousands of paired multi-core processors and flash memories may be uniformly installed at any security gateway system 156. Pairs of multi-core processors and flash memories may be rotated in and out of service in groups. Each safety sub-application may check (read from) one assigned status field to ensure the safety sub-application is cleared to process an SFIOI before proceeding, and may update (write to) at least one different status field(s) upon completing the processing, so that the next sub-application (s) can check the update before performing its safety process on the SFIOI. The set of safety sub-applications may check each SFIOI for at least the following:

confirmation that the SFIOI is received at the correct CS 150—An example algorithm involves checking status; if approved to proceed, reading one or more bytes at the VN origin field; comparing the value to an expected value such as 187; and updating status depending on the result of the comparison.

confirmation that the payload size of the SFIOI meets expectations for the number of VNs purportedly specified in the SFIOI. For example, if a field states that the SFIOI specifies 6 VNs, and the 6 VNs are supposed to be listed at words 8, 9, 10, 11, 12 and 13, the sub-application may check words 14, 15 and 16 to ensure the values in these words are null before proceeding.

confirmation that one or more null word or byte is actually null confirmation that one or more null bits are actually null, such as bits following a party ID in a word dedicated to the party ID or bits following a VN ID in a word dedicated to the VN ID verification that purported owners of VNs are actual owners—An example algorithm involves checking status; if approved to proceed, reading one or more bytes at the Party #1 ID field and the VN #1 ID field; and sending the read data and the page number to the LSS 152—A different sub-application receives responses for VN #1 ID ownership checks, and updates the status field(s) depending on the result.

checking owner instructions and initiating a process to open an outgoing connection from the security gateway system 156 to perform multi-factor authentication to predetermined communications addresses when required by the owner instructions—An example algorithm involves checking status; if approved to proceed, reading one or more bytes at the Party #1 ID field; and sending the read data and the page number to the ID management system 151 to initiate multi-factor authentication if required by the owner—A different sub-application receives responses from the ID management system 151, and updates the status field(s) depending on the result.

After performing a safety check, the safety sub-applications may mark appropriate status fields for each 512-byte page or sector before proceeding, to notify successive safety sub-applications whether they should perform their processing. For example, if any safety sub-application detects an error in any SFIOI, the safety sub-application may update the status of all update fields to show that no more processing is needed by any sub-application for the SFIOI on the page. This can be done by simply indicating that all necessary processing has already been performed so that successive safety sub-applications skip the SFIOIs in which an error is detected.

Some of the safety sub-applications may generate inquiries to external systems within the CS 150 (i.e., external to the security gateway system 156), and it would be inefficient to have any processing resource pause while waiting for answers to inquiries. Communications within the CS 150 may use internal addressing so that an outside party may not be aware of how a security gateway system 156 obtains information from the LSS 152 or the ID management system 151. The only element of the CS 150 assigned any IP address may be the security gateway system 156. For inquiries to eternal systems within the CS 150, a first set of algorithms of the complex software at the security gateway system 156 may send inquiries (e.g., ownership inquiries to the LSS 152), and a second set of algorithms of the complex software at the security gateway system 156 may check for responses to the inquiries.

Figure 2A:
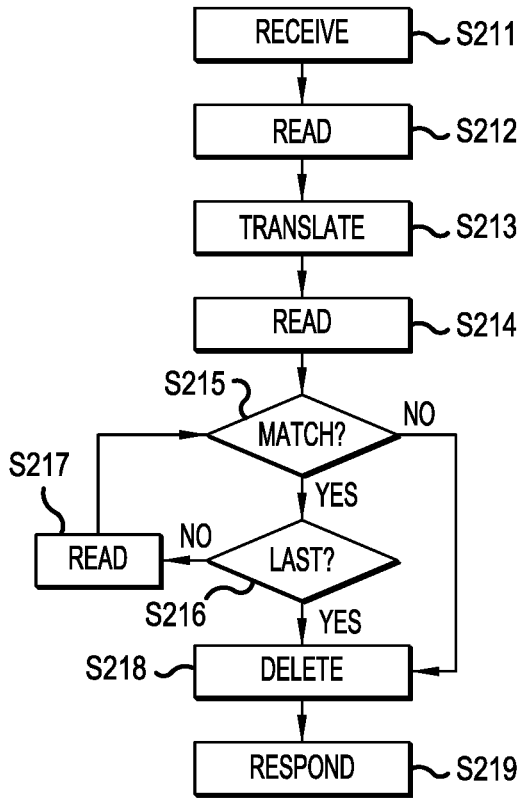
FIG. 2A, FIG. 2B, FIG. 2C, FIG. 2D, FIG. 2E and FIG. 2F illustrate methods for processing short, formatted inquiries and instructions (SFIOIs) for NDCs.

In the method for processing SFIOIs for NDCs in FIG. 2A, the method starts at S211 when a CS receives a SFIOI. At S212, the CS reads a batch count, sender information and counterparty information, and VN information in the SFIOI. The batch count may specify how many VN information fields are in the SFIOI, so that the CS knows where the substantive data of the VN information fields end. The sender information and counterparty information may be unique identifications of a universal type used by the CS, or of other types that can be translated into a universal type used by the CS. The VN information may include unique identifications of the one or more VNs specified in the SFIOI. At S213, the CS translates the sender and/or counterparty information, if necessary. That is, if the sender and/or counterparty information are not of a universal type used by the CS, the CS may translate the sender and/or counterparty information into the universal type used by the CS. At S214, the CS reads the VN info. At S215, the CS determines whether the VN information matches the current ownership indicated in the SFIOI. If the VN information matches the current ownership indicated in the SFIOI (S215=Yes), at S216 the CS determines whether the VN information is for the last VN specified in the SFIOI. If the VN is not the last VN specified in the SFIOI (S215=No), the CS reads the next VN information at S217 and returns to S215. If the VN is the last VN specified in the SFIOI (S216=Yes), the CS deletes the SFIOI at S218 and sends the response to the inquirer or instructor at S219. Also, if the CS determines at any time that VN information does not match current ownership indicated in the SFIOI (S215=No), the CS deletes the SFIOI at S218 and may send the response to the inquirer or instructor at S219.

Figure 2B:
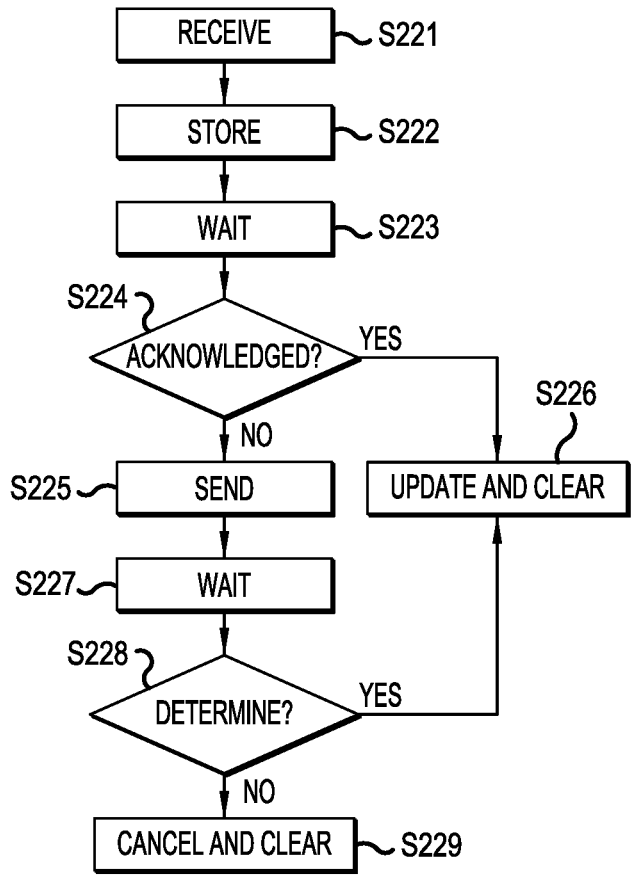

In the method for processing SFIOIs in FIG. 2B, a sender sends a transfer SFIOI that is received by a CS at S221. Typically, a transfer SFIOI from a proper sender should be accepted by a CS. However, if a CS is programmed to confirm receipt of VNs from purported recipients, the CS may perform the remainder of the method shown in FIG. 2B. At S222, the CS stores VN information of the SFIOI in a cache and starts a first timer. The first timer may be, for example, two minutes, five minutes, or another relatively short period of time in which a CS may expect a recipient to receive the VN(s) and acknowledge receipt to the CS. At S223, the CS waits for the first time. When the first time is up, the CS checks at S224 whether the recipient has acknowledged receipt of the VN(s). If the recipient has acknowledged receipt of the VN(s) (S224=Yes), the CS updates the records for the VN(s) at S226 and clears the cache. If the recipient has not acknowledged receipt of the VN(s) (S224=No), at S225 the CS sends an inquiry to the recipient and starts a second timer. The second timer may be the same or longer than the first timer. For example, the second timer may be more than a day in case the recipient is asleep, or otherwise occupied. At S227 the CS waits the second time. The waiting at S227 may be precautionary, and is not necessarily required such as when a default assumption is that a VN has been received. After the second time elapses, at S228 the CS determines whether the recipient has acknowledged receipt. If the recipient has not acknowledged receipt after the second time (S228=No), the CS notifies the sender and the recipient of cancellation of the transfer and clears the cache at S229. If the recipient has acknowledged receipt after the second time (S228=Yes), the CS updates records for the VN(s) and clears the cache at S226.

Figure 2C:
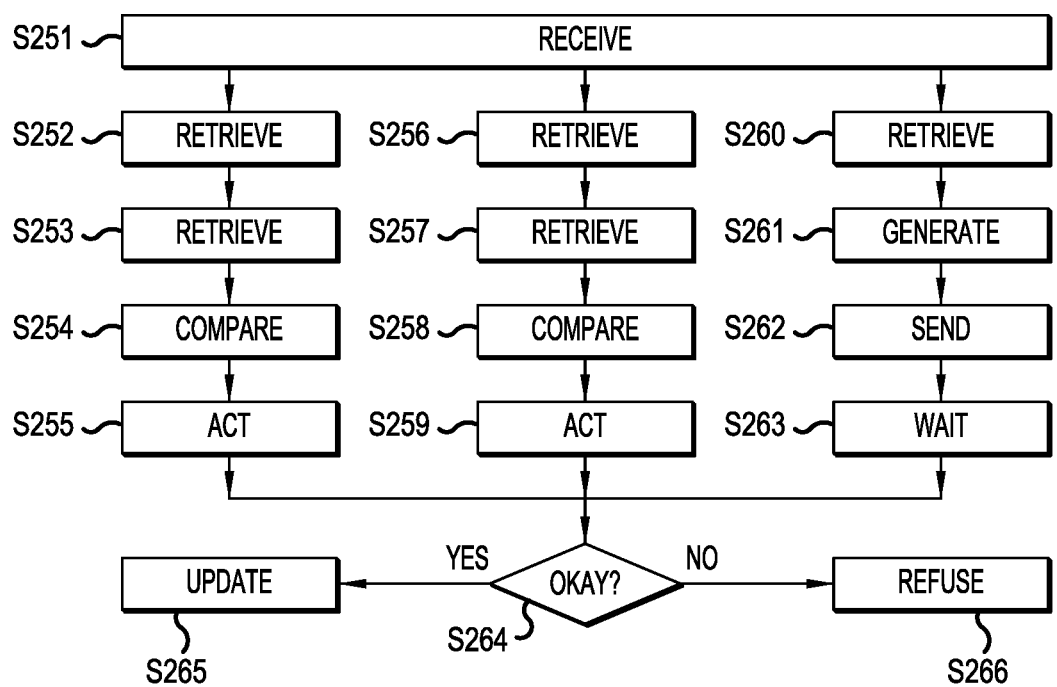

The method of confirming a transfer SFIOI for a VN for NDCs in FIG. 2C starts at S251 when a transfer SFIOI is received by a CS. The transfer SFIOI may include the unique identification that uniquely identifies the VN, identification that identifies the recipient of the VN, and identification that identifies the source of the VN. In embodiments based on FIG. 2C, three separate processes may occur before the electronic history for the VN is updated based on the transfer SFIOI. At S252, party information is retrieved for the recipient. The party information may be one or more forms of unique identification that identifies a party. Party information may include personal information, device information, account information and/or program information. At S253, party blacklists and party greylists are retrieved. For example, the CS 150 may store blacklists and greylists. Separate from blacklists and greylists, other forms of monitoring may be imposed, such as for transactions involving large amounts of VNs or transactions involving a party involved in many other transactions within a relatively small timeframe. For example, the history for a source of the VN and/or a recipient of the VN may be flagged when the source of the VN or the recipient of the VN is relatively new to usage of the VNs, or using a relatively new unique identification to identify themselves. At S254, the party information is compared to the party blacklists and the party greylists. The comparison may be a simple pattern match to see if the submitted information for the recipient matches an entry on one of the party blacklists or the party greylists. At S255, an action is taken if there is a match from the comparison at S254. Actions may include notifying a 3rd party such as a government agency if there is a match to a greylist, or simply adding an entry for the transfer to a record maintained for the recipient being monitored. For a blacklist, an action may simply include informing the recipient and/or the source of the VN that the source is not authorized to transfer the VN or the recipient is not authorized to receive the VN.

In a second sub-process, at S256 the VN information is retrieved. At S257, VN blacklists and VN greylists are retrieved. At S258, the VN information for the VN subject to the transfer SFIOI is compared to the VN blacklists and VN greylists. The comparison at S258 may be a simple pattern match to see if the unique identification that uniquely identifies the VN matches entries on any VN blacklist or VN greylist. At S259, an action is taken if there is a match from the comparison at S258. The actions that may be taken at S259 may include updating a record for the VN if the VN is on a greylist. The actions for matching a greylist may also include initiating an inspection requirement for the VN by ordering that the VN be provided to the CS 150 for inspection of the file for the VN, or that the file for the VN be inspected by a currency reader program or electronic wallet program at an ECD. For a match with an entry on a blacklist, the action taken at S259 may include simply informing the recipient and the source of the VN that the VN is ineligible to be transferred.

For the third sub-process, at S260 registered owner information for the VN may be retrieved. The third sub-process may be an anti-spoofing process that is selectively applied or that is always applied, for VNs. At S261, a notification is generated for the registered owner VN. The notification may be to a communication address on record for the registered owner of the VN, and may include a phone number for text messages, an email address, or another form of communication address for push notifications. The communication address may be obtained from records maintained by the CS 150 for parties registered to conduct transactions with VNs, and may be obtained completely independent of any party information provided with the transfer SFIOIs at S251. At S262, the notification is sent, such as via text message, email, or via a push notification. At S263, the third sub-process includes waiting for affirmative confirmation from the registered owner before authorizing the transfer of ownership in the records. The third sub-process may be expected by sources of VNs, and may be provided over broadband internet networks within seconds of a source issuing a transfer SFIOI even when the source is on the other side of the world from the CS 150.

At S264, the process of FIG. 2C includes determining if the transfer is okay. The transfer of ownership is only okay if there is no match with a blacklist in the first sub-process and the second sub-process, if any requirements are met for greylists in the first sub-process and/or the second sub-process, and/or if confirmation is received in the third sub-process. At S265, the electronic history for the VN is updated if the transfer is okay (S264=Yes). Additionally, the recipient of the VN may be notified that the electronic history for the VN has been successfully updated. At S266, the transfer is refused if the transfer is not okay (S264=No). Additionally, both the recipient of the VN and the source of the VN may be notified that the electronic history for the VN is not being updated.

The process of FIG. 2C may be performed any time ownership of a VN is being transferred, and is separate from the inquiry process performed typically for counterparties. In various embodiments based on FIG. 2C, some of the sub-processes in FIG. 2C may be omitted or replaced or supplemented with other sub-processes. Updating in the process of FIG. 2C may be performed in real-time or near real-time, or may be performed in some respects periodically but not in real-time or near real-time. For example, when the complete set of records for a CS 150 are stored at a central location, the complete set of records may be updated every 12 or 24 hours. An intermediate system remote from the central location may accumulate updates for the 12 or 24 hours, and then update the CS 150 periodically with the accumulated updates. Additionally, a LSS that stores only limited records such as the current owner of each VN, and that can be used for real-time ownership inquiries, may be updated in real-time and may be physically separated from the central location that stores the complete set of records, and from any intermediate system that accumulates updates for a period of time such as 12 or 24 hours. In some embodiments, a main memory system may be updated in real-time, and then may be used to update a secondary LSS that stores limited records such as the current ownership of VNs. In some embodiments, delayed updating may be provided for primary, secondary and/or tertiary backup record systems, and not for record systems that require updated records in order to provide responses to proactive ownership inquiries.

Figure 2D:
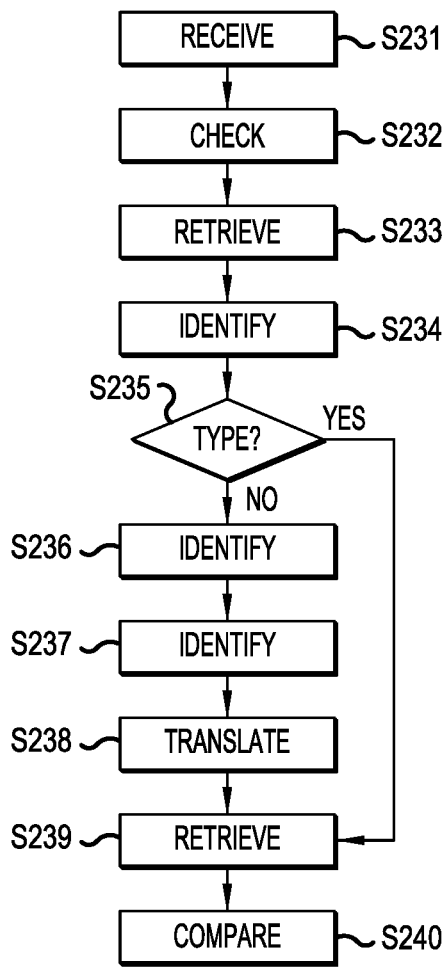

In the method for a CS to process ownership inquiries for one or more VNs in FIG. 2D, at S231, a CS receives an ownership SFIOI for one or more VNs. The ownership SFIOI may include a party identification for the inquirer, a party identification for the purported owner, and unique identification(s) for the one or more VNs. The ownership SFIOI may be received by a security gateway system 156 of a CS 150. At S232, the CS begins performing pre-processing on the ownership SFIOI for security. At S232, the CS reads a VN count. At S232, the CS also checks the VN count against the substantive size of the VN information in the fields for VN information in the SFIOI. The CS may include ranges of numbers of bytes in a SFIOI that should be expected based on the size of the VN count, and if the size of substantive information in the fields for VN information exceeds the expected size, the ownership SFIOI may be deleted at S232.

Security checks at a CS may be performed by processing incoming SFIOIs systematically through threads, cores or processors that are dedicated to repetitively performing the same task(s) repeatedly on specific fields of the SFIOIs and by masking or otherwise blanking any other bits in read words (e.g., 64-bit words) which are not read as part of their instructions. At S233, the CS retrieves party information from the ownership SFIOI. The party information may comprise between 4 and 8 bytes for each party, and may be provided as party identifications in predetermined fields of a packet payload in a SFIOI. The process from S233 to S239 is performed to address aliasing if this is permitted. For example, parties may be assigned universal identifications to use for the CS, but may also correlate other identifications such as telephone numbers, drivers license numbers, email addresses and more with the universal identifications. At S234, the CS identifies and confirms a nation and state or region specified in a party identification. In some embodiments, even a universal identification may include a country code so that CSs may recognize external parties primarily registered with other CSs. When a state identification such as a driver license issued by a state in the U.S. is used as the party information, the state identification may also specify which state a party identification is from. At S234, the CS identifies and confirms the nation and state/region specified in fields of the party identification. If the nation is a nation represented by the CS, the CS may use the data of the state/region field to check for an expected format of a party identification for the specified state/region. At S235, the CS determines whether the party information is of a universal party identification type. For example, several nations which each track their own NDCs may agree on a format for universal party IDs, such as 16 digit identifications where the first 2 or 3 digits indicate which state a party is registered with. At S235, the CS determines whether the party identification is of a universal party identification type. For example, a universal party identification type may include a national identification such as a social security number, or a state identification such as a state drivers license number or state identification number. The CS may be configured to process party IDs universally, so that only universal IDs are accepted and processed. If the party identification is of a universal party identification type (S235=Yes), the universal ID number from the final field is retrieved and confirmed at S239. At S236, if the party identification type is not a universal ID (S235=No), the CS identifies the ID type. For example, an ID type may specify a social network ID and the identity of the social network, or a communications address ID and the identity of the type of communication or service provider that provides a communications account corresponding to the communications address ID. In an embodiment, the ID type may be a telephone number. In another embodiment, the ID type may be an application identification of a currency reader program or electronic wallet program used by a user corresponding to the party ID. At S237, the CS retrieves and confirms the ID number. At S237, the ID number of the ID type identified at S236 is retrieved and confirmed. The ID number may be formatted in a format particular to the ID type, so confirmation at S237 may include checking, for example the length of, the ID number against one or more predetermined parameter for the ID type. At S238, the CS translates the ID number to a universal ID number used by the CS. Translation may involve retrieving a universal ID from a lookup table in a database. The universal ID may be used when processing at the CS is only performed using universal IDs, even though the CS accepts other ID types in SFIOIs. At S239, the CS retrieves and confirms the universal ID number, either after translation at S238 or if the party information is of a universal party identification type (S235=Yes). At S239, the CS retrieves and confirms the universal ID number. Whether translated or not, the universal ID number may be used to check against greylists and blacklists. Of course, greylists and blacklists may be provided for both universal IDs and other types of IDs, so that parties banned from using VNs or subject to monitoring may be identified and transactions processed accordingly. Additionally, records for the parties may be updated to reflect that VNs are being provided to the party or are being transferred to another party, based on transfer SFIOIs, and assuming the transfers are authorized. At S240, the CS compares the VN(s) with the electronic history for the VN(s) to determine whether the current owner of the VN(s) is party listed by the universal party identification received at S231 in the ownership SFIOI. Afterwards, the CS responds to the requesters, such as by a simple yes or no.

Figure 2E:
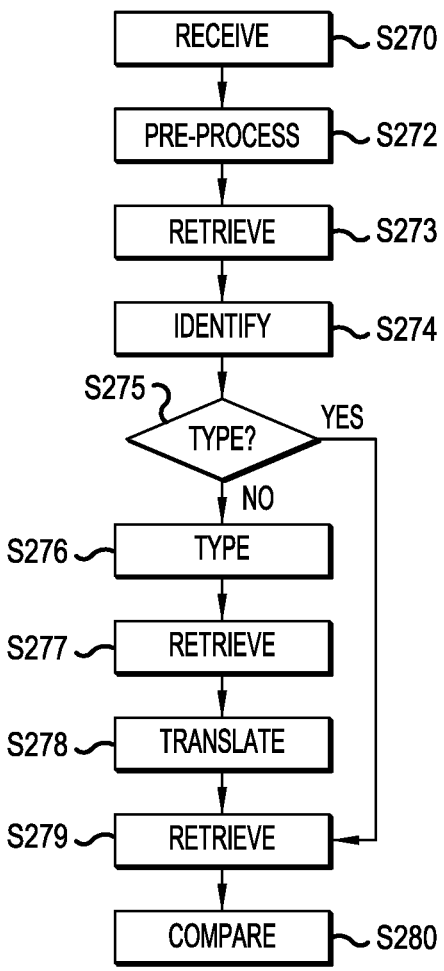

In the method for a CS to process transfer SFIOIs for one or more VNs in FIG. 2E, at S270, a CS receives a transfer SFIOI for one or more VNs. The transfer SFIOI may specify a party identification for the instructor, a party identification for the recipient, and unique identification(s) for the one or more VNs. At S272, the CS begins performing pre-processing on the transfer SFIOI for security. Aspects of the pre-processing described with respect to FIG. 2D are not all repeated herein, but most or all of the pre-processing described with respect to FIG. 2D is equally applicable to pre-processing in FIG. 2E. At S272, the CS reads a VN count in the transfer SFIOI. At S272, the CS also checks the VN count against the actual size of the substantive data in the VN information fields in the transfer SFIOI. The CS may include ranges of the expected sizes of substantive data in VN information for the different potential VN counts, and if the size of substantive data exceeds the expected size, the transfer SFIOI may be deleted at S272. At S273, the CS retrieves party information from the transfer SFIOI. The process from S273 to S279 is performed to address aliasing if this is permitted. At S274, the CS identifies and confirms a nation and state or region specified in a party identification. At S275, the CS determines whether the party information is of a universal party identification type. At S276, if the party identification type is not a universal ID (S275=No), the CS identifies the ID type. At S277, the CS retrieves and confirms the ID number. At S278, the CS translates the ID number to a universal ID number used by the CS. At S279, the CS retrieves and confirms the universal ID number, either after translation at S278 or if the party information is of a universal party identification type (S275=Yes). At S280, the CS compares the VN(s) with the electronic history for the VN(s) to determine whether the current owner of the VN(s) is the party listed by the universal party identification received at S270 in the transfer SFIOI. Afterwards, the CS responds to the instructor, such as by confirming that the electronic histories for the VN(s) will be updated.

In FIG. 2D and FIG. 2E, a party identification is processed when a SFIOI is received at a CS. The CS 150 may be configured to accept only a universal ID as a party ID, or may be configured to accept and process multiple types of party IDs. Additionally, when a CS receives multiple types of party IDs, the CS 150 may translate the multiple types into a universal ID type for consistent processing, or may process each of the different types as-is so long as they are accepted.

In some embodiments based on FIG. 2D and/or FIG. 2E, the CS 150 may store different alternative IDs in different databases, so that each different set of alternative IDs is isolated from all other sets of alternative IDs. For example, a CS 150 may store a first database of translation tables for translating all telephone numbers in the U.S. to corresponding universal IDs used by the CS, and another database of translation tables for translating all currency reader application identifications to corresponding universal IDs. Of course, more than 2 separate database configurations may be used for translations to universal IDs. Isolation of memory arrangements for different memories used for translations of different types of IDs may be used to ensure the fastest possible lookups for universal IDs whenever an alternative ID is received as part of an incoming SFIOI.

As an alternative to lookup tables that store alternatives to universal IDs, a universal ID numbering system may be designed so that alternative IDs may be accepted from approved sources such as large social network providers and communication service providers. For example, if an 11 digit universal ID is used for a population up to 99.9 billion people, a 12th digit at the end may be used to specify whether an SFIOI is coming from a specific account at or from the large social network providers or communication service providers. As an example, user 99999999999 (11 digits) may use 9999999991 (12 digits) to specify instructions that come from the user's Facebook messaging account, 999999999992 (12 digits) to specify instructions that come from the user's Gmail account, 999999999993 (12 digits) to specify instructions that come from the user's Verizon messaging account, and so on. If a 10 digit universal ID is used for a population up to 9.99 billion people, an 11th digit and 12th digit at the end may be used to specify up to 99 different accounts or other characteristics for an SFIOI being sent to a central tracking system. This alternative is alternative to sending a unique social media identification, email address, telephone number or other alternative to a universal ID that is looked up by a CS.

Figure 2F:
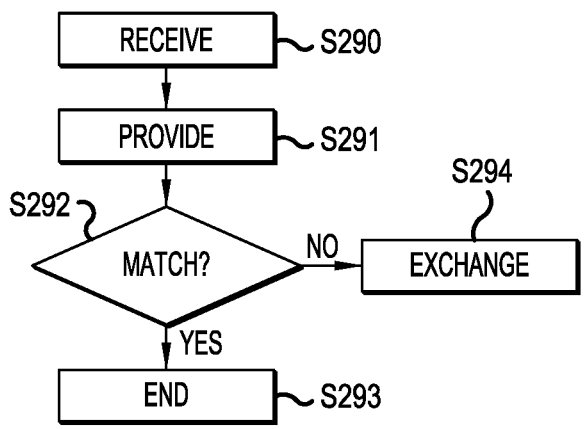

The monitoring, inspection, and replacement method for NDCs in FIG. 2F starts at S290 by receiving a greylist detection notification. The greylist detection notification may be generated at a CS 150 when notification of movement of a VN on a greylist or to or from a party on a greylist is detected. The CS 150 may have an automated process set up to initiate the process of FIG. 2F for some or all such notifications. At S291, the new owner of the VN is provided with expected VN characteristics and instructions to compare the expected VN characteristics with the VN and report the results. At S292, a determination is made as to whether a match occurs. The determination at SS92 may be received as a notification result from the new owner of the VN after a currency reader program or electronic wallet program analyzes the VN. If there is a match, the process of FIG. 2F ends at S293. If there is no match, the CS 150 may exchange the VN for a replacement VN of the same denomination at S294. For example, the CS 150 may instruct the ECD to forward the VN that does not match expected VN characteristics, and then provide the ECD with a new VN as a replacement. The process of FIG. 2F may result in exchanges for any number of reasons including attempted tampering, successful tampering, wear-and-tear, aging, counterfeiting, passage through owners or geographic regions or nations being monitored via greylists, or any other explanation for why a VN does not include expected characteristics. Exchanges as at S294 may be expected typically for wear-and-tear such as losses of data from dropped packets during communications over electronic communication networks.

Figure 3A:
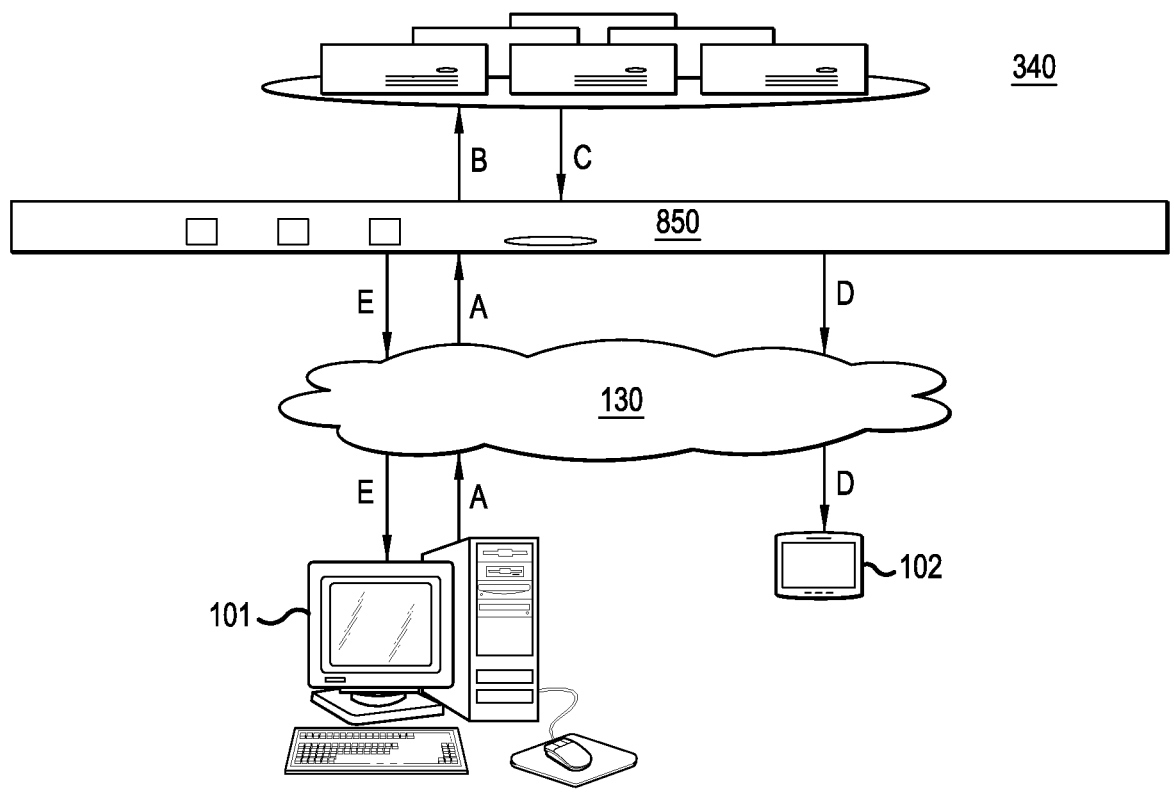
FIG. 3A illustrates a cloud-based transaction flow for NDCs.

In the cloud-based transaction flow for NDCs in FIG. 3A, a data center 340 is used to handle large volumes of data managed by a CS as described herein. The infrastructure in FIG. 3A includes a device 101, a device 102, one or more electronic communications network(s) 130, a CS 150 and a data center 340. The device 101 initiates a communication at step A through the electronic communications network(s) 130 to the CS 150. The communication at step A may be a transfer SFIOI to transfer a VN from the device 101 to the device 102. The CS 150 sends a request to verify and/or retrieve information to the data center 340 at step B. The request to verify and/or retrieve information at step B may be a request to confirm that the VN is owned by an owner of the device 101. The data center 340 responds with either verification or the requested information at step C. The verification or the requested information at step C may confirm that the VN is owned by the owner of the device 101. The CS 150 initiates a communication at step D to the device 102. The communication at step D may be a notification to the device 102 that the VN will be transferred to the device 102 by an instruction from the device 101 Although the communication at step A is from the device 101 in FIG. 3A, in alternative embodiments the CS 150 may receive the communication at step A from the device 102 or from both the device 101 and the device 102. At step E, the CS 150 responds to the device 101, such as to confirm the transfer SFIOI based on the verification or requested information from step C. Using the infrastructure in FIG. 3A, VNs of NDCs may be verified, transferred, and tracked. For example, when a device 101 is requesting transfer of a VN to the device 102, the CS 150 may check records at the data center 340 and notify the device 102 of the transfer when the VN belongs to the device 101. The CS 150 may update records at the data center 340.

The data center 340 may store large amounts of data. The data stored at a data center 340 and retrievable for use from the data center 340 may include:

Greylists for VNs: lists of VNs currently suspected of being involved in problematic activity, including handling instructions for each VN on a greylist each time the VN is being transferred.

Blacklists for VNs: lists of VNs that have been reported lost, stolen, retired, and which should not be involved in transfers, including handling instructions for each instance in which a VN on a blacklist is purportedly being transferred.

Greylists for parties: lists of parties, ECDs, currency reader programs and electronic wallet programs suspected of being involved in problematic activity, including handling instructions each time an entry on a greylist is provided in a SFIOI as being a transferer or a transferor.

Blacklists for parties: lists of parties, ECDs, currency reader programs and electronic wallet programs that have been banned from involvement in use of VNs for any reason, including handling instructions each time an entry on a blacklist is provided in a SFIOI as being a transferer or a transferor.

The data center 340 in FIG. 3A is representative of one or more data centers that may be used to store data for the CS 150, and is representative of any other form of large-scale storage used for implementing an NDC. The data center 340 may provide one or more of the elements in FIG. 1C, even if the data center 340 is otherwise isolated from the public except through the security gateway system 156.

The data center 340 in FIG. 3A may also be implemented as part of a cloud configuration for an NDC, including a private cloud configuration that isolates equipment and operations for the NDC from equipment and operations for other parties and uses. The data center 340 may be implemented using solid-state drive (SSD) arrays. SSDs may be preferable to hard disk drives (HDD) in terms of faster speeds and lower power use etc.

Additionally, VNs may include a private address that is useless to the public in a metadata field. The private address may be an address that is interpretable by the CS 150, and may include a private server or database address, or even a specific port address of a private server or database address. In this way, if a VN sends updates for the VN's records back to even a private cloud, the CS 150 may unpackage part of the update to identify which private server or database address stores the record for the VN. This may serve as a supplement or alternative to addressing based on unique identifications of the VNs, so that even if a CS even partially uses the unique identification of a VN to identify a subgroup of servers and databases used to store the record for the VN, the private address sent by the VN may be used to specify a server, a database, a server port, a database port, or another internal communications address within the subgroup for a component that is not reachable by any public address.

Figure 3B:
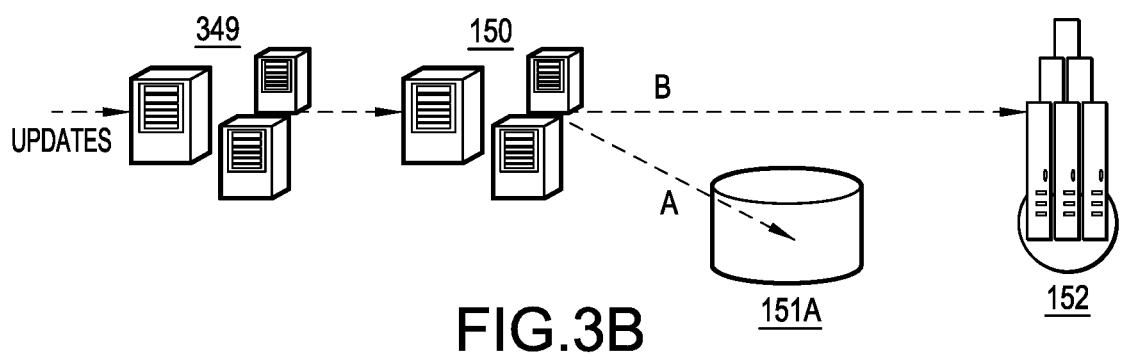
FIG. 3B illustrates a system for storing records for virtual notes (VNs) of an NDC.

In the system for storing records for VNs of an NDC in FIG. 3B, a filtering/isolation system 349 filters and isolates SFIOIs before they are received by the CS 150. The filtering/isolation system 349 may inspect each SFIOI to ensure that each SFIOI conforms to requirements for SFIOIs. The inspection may involve a size check for determining a data size of each SFIOI, a type of each SFIOI, an expected order of information in each SFIOI, and/or any other type of information that can be derived from SFIOIs. The filtering/isolation system 349 may serve two purposes: 1, filtering out any hacking attempts by ensuring that SFIOIs do not contain executable code that may corrupt either of the first memory subsystem 151A or the LSS 152, and 2, strictly ensuring that SFIOIs meet requirements. The filtering/isolation system 349 may include or be included in, or otherwise integrated with the security gateway system 156 in FIG. 1C, or may be an alternative to the security gateway system 156.

Figure 4A:
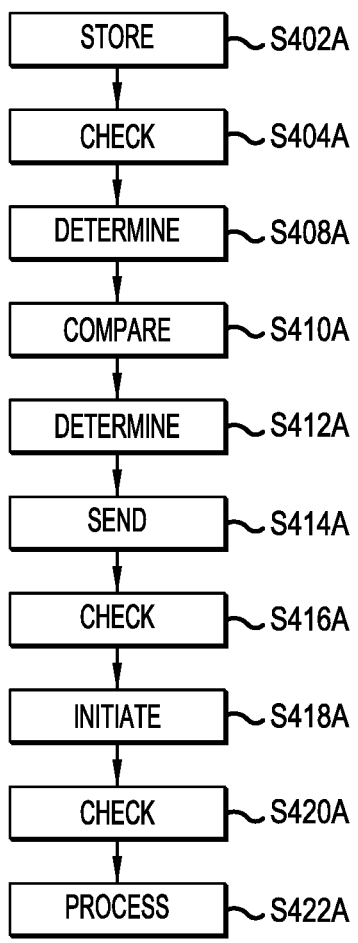
FIG. 4A illustrates a method of a security gateway system processing a received SFIOI.

The method of a security gateway system processing a received SFIOI in FIG. 4A is an overview of security checks performed at a security gateway system 156, and starts at S402A by storing a packet payload in an address space. Packet sizes may be standardized for processing at a security gateway system. For example, SFIOI packets may be 512 bytes, and then stored individually in pages of flash memory for processing at the security gateway system. The packets may be sent asynchronously from anywhere in the world without initiating a connection, so that the sender may expect a fast response if the packet is processed and meets expectations of the security gateway system. Of course, the teachings herein are not limited to packets that are 512 bytes, or that are all of a uniform size, as these details may be considered optimal in some ways. Packets may also be standardized to a fraction or multiple of 512 bytes for similar reasons relating to standardized and uniform processing and storage. At S404A, a size of the packet payload in bytes is checked. For example, the checked size may be the amount of meaningful data in the packet, such as all date except the header. Insofar as parties in a transaction may be uniquely identified by as few as 4 bytes, and insofar as VNs specified in a SFIOI may be uniquely identified by as few as 5 bytes, an SFIOI specifying 7 VNs may include as little as 43 bytes of meaningful data if no other fields are provided. However, other fields may be required, such as a field for a nation or region issuing the VNs (1 byte), a separate field for each VN specifying denomination (1 byte for each VN if not implicit in the VN identification), a separate field for the number of VNs purportedly identified in the SFIOI (1 byte), a separate field for the relative placement in a total number of packets being separately sent in a batch (1 byte), and so on. The total length of the meaningful data in the packet may be specified in a header of the packet, and this header information may be compared with the actual length of the meaningful data stored in the address space. At S408A, the number of VNs purportedly identified in the SFIOI is determined. The number of VNs purportedly identified in the SFIOI may be specified in a specific byte for the SFIOI. At S410A, the expected size of the meaningful data in the packet is established from the number determined at S408A, and the expected size determined at S410A is compared with the actual size determined at S404A. Of course, if there is a discrepancy the packet may be deleted from the address space, as the security gateway system may consistently eliminate any threat or potential threat as soon as the threat or potential threat is identified. At S412A, the purported owner identification for the VNs specified in the SFIOI is determined. The purported owner may be identified by as few as 4 specified bytes in a SFIOI. At S414A, the purported owner identification is sent along with each separate VN identification for an ownership check. The purported owner identification may be sent with each separate VN identification in a single communication or as a batch of separate communications to the LSS 152 in FIG. 1C. As a reminder, the LSS 152 may include records of only the current owners of each VN, or another set of data less than the full record for any VN or party stored in the main memory system 153. At S416A, a check is made for stored instructions from the actual owner of the VNs, if any such instructions exist. The check at S416A may be to the main memory system 153 if the handling instructions from owners of VNs are stored there, or to the LSS 152 if the handling instructions from owners of VNs are stored there, or to another storage system that stores handling instructions if separate from LSS 152 and the main memory system 153. At S418A, anti-spoofing is initiated, if indicated by the stored instructions checked at S416A. For example, owners of VNs may specify that multi-factor authentication should be invoked any time VNs owned by the owners are subject to a SFIOI to the CS 150. At S420A, a type of the SFIOI is checked. The type may include inquiry, instruction to transfer to another party, instruction to transfer to a different account or device of the same owner, instruction for special handling, and so on. At S422A, the SFIOI is processed, according to the checked type. If the instruction is an instruction to transfer ownership of the VNs, an instruction may be sent to the main memory system 153 to update the ownership records for the VNs and a separate acknowledgement may be sent to the source of the instruction. If the instruction is an inquiry as to ownership of the VNs, an acknowledgement may be sent to the source of the instruction confirming the ownership as the purported owner identified in the SFIOI, if correct. In some embodiments, the unique identification for a VN may be encrypted so that counterparties can send the encrypted unique identification to the CS 150 to confirm the denomination and the ownership of the VN without knowing the unique identification until a transaction actually occurs. Thus, processing may also include decrypting unique identifications for VNs when the SFIOI is an ownership inquiry, and the unique identifications of VNs may only be decryptable by the CS 150, and specifically by the security gateway system 156. Other processing may involve notifications to other CSs that track other NDCs, or other instructions or acknowledgements processed by the security gateway system 156.

Figure 4B:
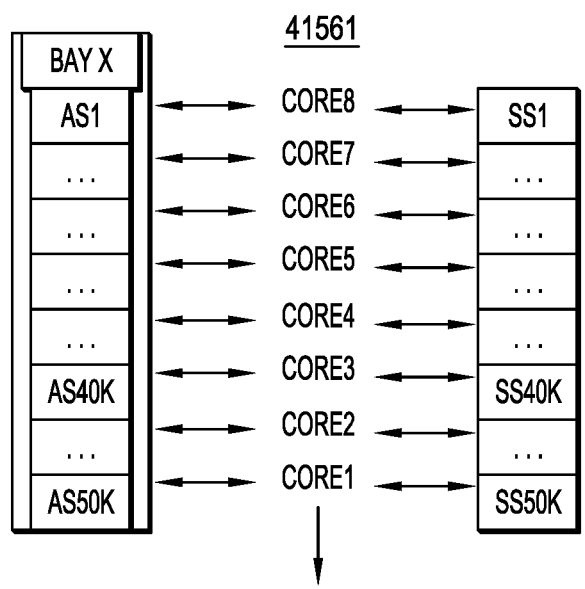
FIG. 4B illustrates a processing arrangement for a security gateway system.

In the processing arrangement for a security gateway system in FIG. 4B, a set of cores at a first server 41561 refer to status spaces which store statuses for each of the address spaces on a 1 to 1 basis. The status spaces may be RAM similar to working memory used in internet routers and switches, and the address spaces may be flash memory. In this regard, whereas the address spaces may fit an exact SFIOI size of 512 bytes or another relatively large amount, the status spaces may be on the order of 4 bytes. For example, within 4 bytes or perhaps 5 bytes, the status spaces may specify which address space they correspond to, along with the actual status of the address space. The statuses may specify which of the cores is to process the address space next and/or which of the cores processed the address space last. In this way, the set of cores can refer to the status spaces sequentially and process the packet payloads in the corresponding address spaces when the status indicates that the core is to process the packet payloads in the corresponding address spaces. The first core (core #1) should start the processing on any address space starting with the first address space (AS1), then update the corresponding status space (SS1), then start processing the second address space (AS2), then update the corresponding status space (SS2). The remaining cores will start processing with the first address space once the first status space (SS1) indicates to do so, and then update the first status space (SS1) before checking with the next status space. Of course, if any processing indicates that the packet payload in the corresponding address space should be deleted or otherwise left alone, the status in the status space may be updated to reflect a status that indicates deletion, such as "99" to indicate that the next processing will be deletion. When processing for any of the address spaces is completed, the statuses in the corresponding address spaces should also be updated to reflect that the next process will be deletion. In this way, once all packet payloads in bay X are regularly processed and ready to be deleted, the last status in the corresponding status spaces may uniformly reflect the status that indicates deletion. When bay X is fully deleted, bay X may be put back into circulation for another batch of incoming packets. The bays may be given a break, such as 30 or 60 minutes, after use, in order to allow the circuitry to cool down etc.

In FIG. 4B, when a core recognizes that it is not yet needed, the core may be triggered to delay processing. However, in the context of cores processing 40000 or more packets per minute, a delay in processing may be very small, such as ¼ second or ¹/₁₀ second or less. In ¼ second, a core should be able to advance by approximately 170 packets. Given the advantage in simplicity and processing and memory resources, embodiments based on FIG. 4B may use relatively more address spaces for a relatively larger amount of received packets. For example, the first server 41561 in FIG. 4B may accept 200000 or more packets for 5 minutes before newer packets are switching to a second server, or at least to another bay of the first server 41561. Before the CS 150 is implemented, testing may be performed to optimize how long any server operates to receive and process packets before being rotated out of line. Testing may also be performed to optimize how many servers are in use at one time, how incoming packets are distributed to different servers, and so on.

In some embodiments, the cores in FIG. 4B are replaced by individual threads that refer to the status spaces instead of the individual cores, insofar as a core may implement multiple threads and therefore may perform multiple processes on the same address space, and update the corresponding status space more than once.

Figure 4C:
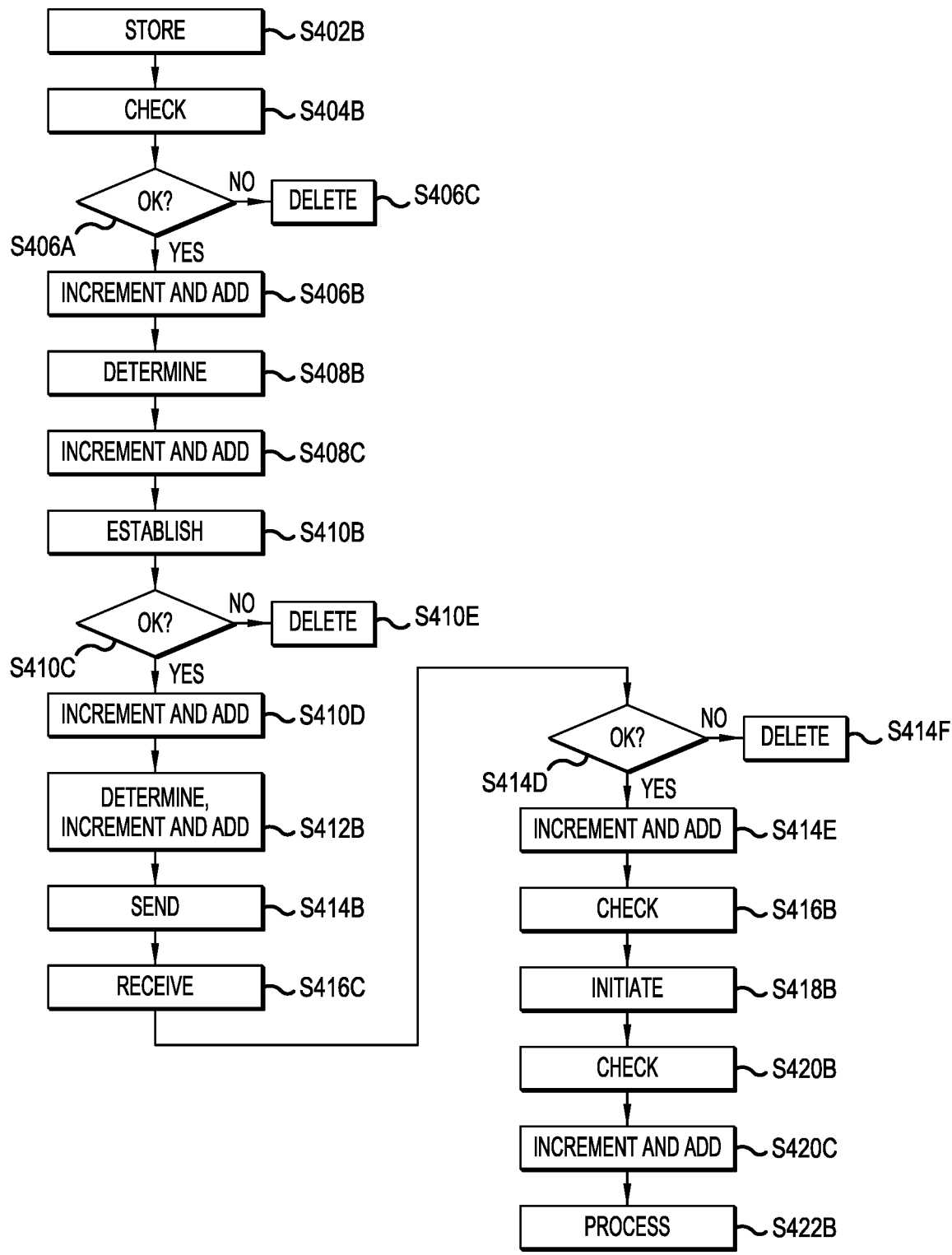
FIG. 4C illustrates a method of a security gateway system processing a received SFIOI.

In the method of a security gateway system processing a received SFIOI of FIG. 4C, resources individually and separately process a packet payload in an address space at the security gateway system 156. Before the method of FIG. 4C starts, packets are received. For an NDC, SFIOIs may be expected at a rate of tens of thousands per minute, and perhaps more per minute for at least part of some days. Accordingly, the packets are received and immediately written into sequential address spaces so that the packets can be processed. After all packets in a bay are processed, all address spaces in the bay may be cleared by deleting the data therein. At S402B, the packet payload is stored in an address space. The header of the packet with the packet payload may also be stored in the address space, and data from both the packet payload and the header may be retrieved and processed by resources in the method of FIG. 4C.

At S404B, the size of the packet payload in bytes is checked by a first resource (i.e., resource 1). The first resource may be a thread, core, or processor, and may be a resource that iteratively performs the same process(es) iteratively one at a time for address spaces in a bay. The size of the packet payload may be checked by inspecting the presence of meaningful data in the address space, such as by searching for an end pattern used to specify the end of a packet payload and/or reading a packet size field in the header. An end pattern may be used for SFIOIs to specify the last byte of a packet payload. In some embodiments, the packet size data from the header may be compared with the results of a search for the presence of the meaningful data in the address space. The packet size data and the actual size of the meaningful data in the address space may also be compared with one or more predetermined threshold(s), such as a maximum size or exact size allowed for SFIOIs.

At S406A, a determination is made as to whether the checked size is okay. If the checked size is not okay, such as if the packet size data and/or the actual size of the meaningful data in the address space indicate that the packet payload is larger than the maximum size or exact allowed for a SFIOI, the packet is deleted from the address space or marked for deletion at S406C. If the checked size is okay, the first resource is incremented and the address space for which packet payload size was just checked at S404B is added to an address queue for the next resource (i.e., resource #2) which will process the address space at S406B. At S408B, the number of VNs purportedly identified in the SFIOI is determined by a second resource (i.e., resource #2). The number may be specified in a field required for the SFIOI, such as by a byte or even fewer than 8 bits. At S408C, the second resource is incremented and the address space for which the number of VNs purportedly identified in the SFIOI was determined is added to an address queue for the next resource (resource 3) which will process the address space. At S410B, an expected size of the packet payload is established from the number of VNs determined at S408B. Since VN identifications should be of uniform sizes, the expected size of a packet payload may be predetermined based on the number of VNs. Additionally, since the number of VNs which can be specified in a packet may be kept at or below a maximum size such as seven, the potential sizes of packet payloads may also be minimized to a number such as seven. At S410B, the expected size is compared to the checked size from S404B. The expected size should match the checked size, though it may be possible that small discrepancies will be tolerated for reasons which are not yet apparent.

At S410C, a determination is made whether the comparison at S410B resulted in a match (ok) or not (not ok). If the expected size and the checked size match (S410C=Yes), the third resource is incremented and the address space for which the comparison was just made at S410B is added to an address queue for the next resource (resource 4) which will process the address space at S410D. If the expected size and the checked size do not match (S410C=No), the packet is deleted from the address space or marked for deletion at S410E.

At S412B, a party identification for a purported owner of a VN and a party identification for a purported counterparty (if any) are determined by the fourth resource, and then sent for aggregate checks by the fourth resource. The fourth resource is incremented, and the address space for which the determination was just made at S412B is added to queue(s) for the next 7 resources (resources 5 through 11). The aggregate checks for owner and counterparty identification are performed by sending an internal inquiry to a separate part of the CS 150, such as to the ID management system 151. The aggregate checks may involve checking to see if the party identification for the purported owner of the VN and the party identification for the purported counterparty (if any) are on a blacklist or greylist. The aggregate checks may be performed in parallel with the remainder of the method of FIG. 4C, so that any results that should prevent execution of a response to an SFIOI at S422B may be received before S422B is performed later. Additionally, the address space is added to queue(s) for the next 7 resources in the example where the maximum number of VNs allowed for SFIOIs is 7; however, in some embodiments the resources process more than one VN identification at a time, and in some embodiments the maximum number is fewer than 7 or more than 7. At S414B, the purported owner identification and each VN identification are sent separately for ownership checks by the next 7 resources (resources 5 through 11). The ownership checks may be performed by sending internal inquiries to the LSS 152, and may involve simple comparisons of whether the purported owner of a VN matches the listed owner of the VN. The address space for the SFIOI for which the ownership check is being made is added to the queue(s) for the next 7 resources (resources 12 through 18). Using another set of resources for responses may be done so that no resource is both sending an inquiry and waiting for a response, in order to maximize efficiency of the resources used in processing at the security gateway system 156.

At S414C, responses to the ownership checks at S414B are received by each of the next 7 resources (resources 12 through 18), and may specify, for example a match or no match for the current owner. In other words, even a single bit may be used to signal a match or no match for an ownership check. The responses at S414C may simply specify the address space for the packet payload being checked and either the relative VN being checked in the packet payload or the resource which made the request at S414B. At S414D, a check is made whether all the ownership inquiries at S414B resulted in a match. If all the ownership inquiries at S414B resulted in a match according to the results received at S414C (S414D=Yes), the twelfth through eighteenth resources are incremented at S414E and the address space is added to the queue for the next resource (i.e., resource 19). If any of the ownership inquiries at S414B did not result in a match (S414D=No), the packet is deleted from the address space or marked for deletion at S414F.

At S416B, a check is made for stored instructions from the actual owner, if any, by resource 19. The check may be performed by sending an inquiry for any of the VNs to the main memory system 153, to look up the actual owner and see if any handling instructions are specified. For example, an owner may specify that no VNs should be transferred from their ownership without using multi-factor authentication, without confirming the transfer in a phone call or email or via another mechanism, or another type of special handling. After sending the inquiry, resource 19 may increment and add the address space to a queue for the next resource (i.e., resource 20). In some embodiments, owner instructions for VNs may be stored at the LSS 152, or another system (not shown) that is provided in parallel to the LSS 152 but which stores cursory information for owners as to any special instructions for handling VNs they own. For example, an owner may specify that no VNs are to be transferred without multi-factor authentication, or without the owner first updating the cursory information in advance to allow for transfers.

At S418B, the twentieth resource initiates anti-spoofing measures, if indicated by the response to the inquiry by the nineteenth resource from S416B. Anti-spoofing may be performed by initiating a multi-factor authentication check, and then having another resource (not shown in FIG. 4C) wait for the authentication. In some embodiments, multi-factor authentication may include dynamically generating a code such as a set of 2 characters, and sending the code or characters to a predetermined communication address such as a telephone number for the actual owner of the VNs. The actual owner may be required to type in the 2 characters in a response confirming the transfer. The details of waiting for a response to the anti-spoofing check and processing the response are not shown in FIG. 4C because there is no room left on the page to properly show more processes, even though more processes may be included. After the anti-spoofing check, the resource(s) performing the anti-spoofing check increment and add the address space for the resource to the queue(s) for the next resources.

At S420B, the next resource (i.e., resource 21) checks the type of the SFIOI. At S420C, resource 21 is incremented, and the address space for the packet is added to the queues for the next resources which actually process the SFIOI. The number of resources which process the SFIOI may vary based on how many different types of different actions can be performed based on an SFIOI. At S422B, the SFIOI is processed by one or more of the next resources (resources 22+). Processing may include sending an instruction to update ownership and owner records at the main memory system 153 and confirming a transfer SFIOI to the source, or simply confirming an ownership inquiry to the source. The confirmation of any ownership inquiry may be made by default without any further inquiries here since ownership was checked at S414B and the SFIOI would have been answered already or deleted or marked for deletion if the ownership inquiry had one or more negative results. Other types of processing may be possible, such as updating handling instructions, or transferring ownership records to reflect that an owner has moved specific VNs from one custodial account to another or from one device to another.

Figure 4D:
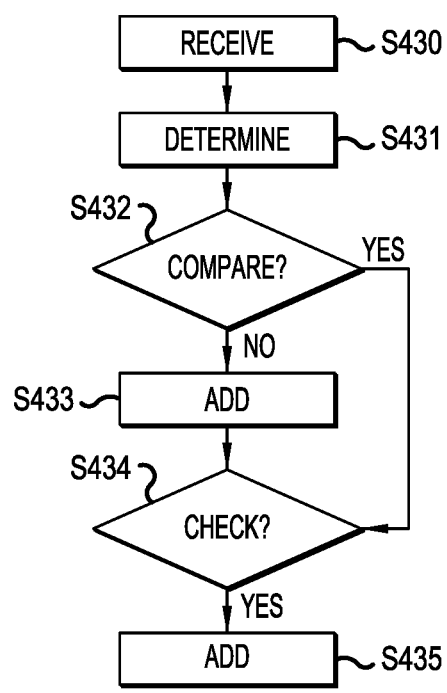
FIG. 4D and FIG. 4E illustrate methods for security checks at a memory system of a CS.

The method for aggregate security checks at a memory system of a CS in FIG. 4D may be performed at or by the main memory system 153, at or by the AI and analytics system 154, or at another element of the CS 150. The method may be performed in order to check patterns for an initiating party and/or a counterparty in any transfer, such as to see if an account is being drained suspiciously or is being filled suspiciously. Since suspicions may be relative for different people, places and times, different thresholds and analytics may be applied to look for different patterns.

At S430, a record update for transferred VNs is received. The record update may be stored both in the histories for the VNs and in the histories of the initiating party and the counterparty. Different algorithms may be applied to the histories for the VNs and the histories of the initiating party to check for different characteristics of patterns. At S431, aggregate amounts for the transferee and transferor for recent period(s) are determined. The aggregate amounts may be total amounts transferred to or from the transferee and transferor in the past 60 seconds, 5 minutes, 30 minutes, 1 hour, 24 hours and/or other amounts of time. At S432, the aggregate amounts are compared to thresholds to see if the aggregate amounts are higher than the thresholds. The comparisons at S432 may involve comparisons of different aggregate amounts with different thresholds, and the thresholds may vary for different parties such as based on averages or highest amounts of lowest amounts owned by the parties in recent periods. In this way, a determination may identify that $800 being removed from an owner out of $1000 in the owner's name over 3 or 4 transactions in a day is suspicious, but $800 being removed from an owner out of $10000 in the owner's name over 3 or 4 transactions in a day is not suspicious. Therefore, CSs described herein such as the CS 150, may check a history for a source of a VN and/or a history for a recipient of a VN for each transaction, to flag when the source of the VN and/or the recipient of the VN is involved in unusually large volumes of transactions or unusually large amounts of transactions. If one or more of the aggregate amounts is higher than the corresponding threshold(s) (S432=Yes), the corresponding party may be added to a blacklist or greylist at S433. If no aggregate amount is higher than the corresponding threshold (S432=No), additional checks may be performed. A blacklist may also list parties presenting VNs they do not own or that are counterfeit, and/or may list parties who present counterparties and information of VNs (e.g., as VN_info) that do not correspond to the counterparties being presented, or who are not consenting to transfer the VN. Blacklists may also list parties who are banned from receiving VNs and greylists may list parties who are being monitored. The blacklists may include parties who have been identified as submitting incorrect purported identifications of sources of VNs for ownership inquiries to the CS 150, parties who have been identified as submitting unauthorized transfer SFIOIs to the CS 150, parties who have been subjected to detected spoofing attacks, parties who have been identified as attempting to alter VNs, or any other parties which the CS 150 has found reason to ban from receiving ownership of VNs. Blacklists may specify information such as currency reader programs and wallet programs which have handled VNs reported lost or stolen, and are not limited to listing only unique identities for parties.

Greylists may include parties being subject to monitoring by government or regulatory authorities for suspicious activities such as potential criminal activity, parties in specific locations or geographical regions such as specific countries, or parties who are relatively new to the CS 150 or who are using a relatively new unique party identification. Greylists may be updated based on some types of activity, such as SFIOI inquiries which specify unique identifications of VNs and party identifications which do not match. For example, a count and/or list may be included in a greylist entry for when a party submits an inaccurate SFIOI, and when this occurs twice in a relatively short timeframe such as 2 hours, the party identification may be transferred from the greylist to a blacklist with the understanding that the party identification has been compromised.

A transaction requesting party may be placed on a blacklist or greylist depending upon whether a transaction requesting party can be shown or strongly suspected of engaging in potential fraud. All or a subset of requests received by the verification service may be checked against the blacklist to either see if purported requesting parties repeatedly provide erroneous information, and to ban purported requesting parties if the verification service confirms or even suspects that the transaction requesting parties are intentionally providing erroneous (e.g., fraudulent) information.

Additionally, a VN blacklist may include VNs that have been retired or reported as stolen or missing. As an example, a VN may be retired once one or more counterfeiting attempts involving the same unique identification have been detected. The VN greylists may include VNs that are being monitored after being owned by parties monitored by government or regulatory authorities for suspicious activities such as potential criminal activity. For example, when a party is subject to an investigation by tax authorities, the tax authorities may order the CS 150 to place all VNs currently owned by the party on a greylist so that movement of the VNs can be recorded specifically for a file maintained for the person. At S434, another check may involve a timing trigger or location trigger. For example, transfers from a party to an internet protocol address in a dangerous regions may trigger an addition to a blacklist or greylist. As another example, transfers from a party at 2:00 AM local time may trigger an addition to a blacklist or greylist. At S435, the party is added to the blacklist or greylist if the timing or location generates a trigger (S434=Yes), and otherwise the process of FIG. 4D ends.

Figure 4E:
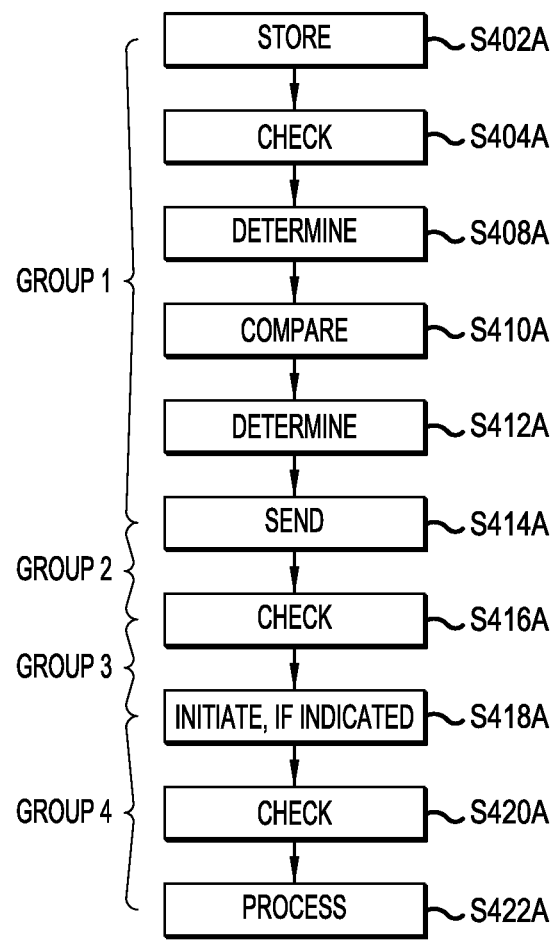

In the method of a security gateway system processing a received SFIOI in FIG. 4E, the method of FIG. 4A is broken up into 4 sections as an example of how different graphics cards or groups of processors in one or more graphics cards may be assigned to different tasks in a security gateway system. As is known in modern processing, graphics cards may include numerous processors that operate largely in parallel, given the original task of rendering graphics data for large numbers of pixels simultaneously. The use of numerous processors has been applied to a variety of other tasks. A security gateway system 156 of a CS 150 may be expected to operate on a continuous basis with tens of thousands of SFIOIs being received per minute at times. Accordingly, tasks performed at the security gateway system will inherently be performed in parallel for different received packets. As long as the processing provided by graphics cards can be properly applied to SFIOIs, graphics cards may be used.

In FIG. 4E, the processors are broken up into 4 groups. The processing of each group may end when an inquiry is sent to a separate internal system, since one of the simplest, if not the simplest, ways to ensure efficient processing is to not have any processors specifically waiting for an answer to an inquiry they sent out, and not having to route answers back to specific processors that sent an inquiry. The use of status spaces as in FIG. 4B can ensure that each address space is efficiently processed. As an example, 3200 processors in a graphics card may be divided into 4 groups of 800 processors. The processors may process address spaces 800 at a time. The parallel aspect of the processing that leverages graphics cards results from applying the groups to different groups of address spaces simultaneously, so that a first group may be processing address spaces 2401-3200, the second group may be processing address spaces 1601-2400, the third group may be processing address spaces 801-1600, and the fourth group may be processing address spaces 001-800. Processors in each group may increment 800 address spaces at a time once completed with their current processing. Of course, groups of processors do not all have to have the same number of processors, such as if the tasks performed by one group can be performed faster than tasks performed by another group. Rather, in order to enhance relative continuity in processing, sets of one or more first tasks that require more processing time than sets of one or more second tasks may be assigned to a first group of processors that includes more processors than a second group of processors that perform the sets of one or more second tasks.

Figure 5A:
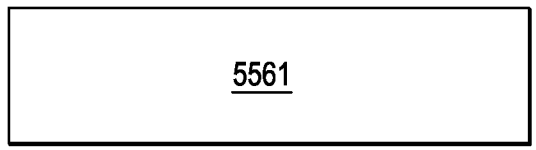
FIG. 5A, FIG. 5B, FIG. 5C and FIG. 5D illustrate memory arrangements for a security gateway system that processes received SFIOIs.
Figure 5A:
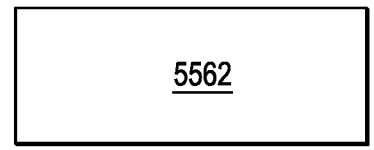

In the memory arrangement for a security gateway system that processes a received SFIOI in FIG. 5A, a security gateway system such as the security gateway system 156 in FIG. 1C includes a variety of electronic components including a SFIOI memory 5561 and a physically-separate status memory 5562. The SFIOI memory is expected to store SFIOIs on a one-to-one basis, such as one SFIOI per page of 512 bytes, or a basis of one SFIOI per multiples or fractions of a page of 512 bytes. The status memory 5562 is expected to store status updates as processors, cores or threads process the SFIOI in the SFIOI memory.

One aspect of technological concerns addressed herein is the program/erase cycles of the security gateway system 156. Status updates may require writing two or more status updates to the status memory 5562 for each SFIOI written to the SFIOI memory 5561. However, since writes to the status memory 5562 may be limited to a byte or a word at each instance, each potential status update may be written to a different bit, byte or word of the status memory 5562. In this way, a thread may first read the status memory 5562 to determine if the prerequisite processing has been performed by referencing the statuses of bytes or words that have already been updated.

As a simple example, a thread #7 may check the status of byte #6 which is updated by thread #6, and if the status shows that thread #6 has already processed the SFIOI, thread #7 may then read whichever portion of the SFIOI is processed by thread #7. When thread #7 is finished with processing the SFIOI, thread #7 may update byte #7 in the status memory to show that thread #7 has completed its processing of the SFIOI. As should be clear, this processing by thread #7 may be extremely fast, such as at a rate of 40 k or more SFIOIs per minute, and this may be true of the other processors, cores and threads that process SFIOIs at the security gateway system 156.

Figure 5B:
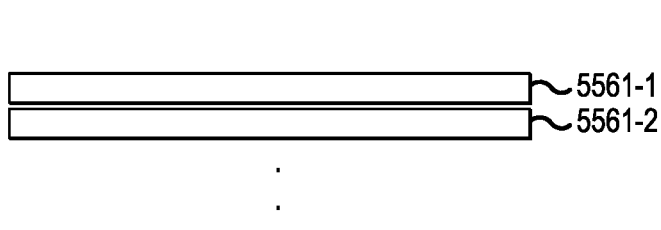
Figure 5B:
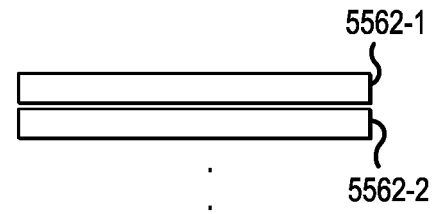

In the memory arrangement for a security gateway system that processes a received SFIOI in FIG. 5B, the SFIOI memory 5561 is shown to include a first SFIOI memory 5561-1, a second SFIOI memory 5561-2, and so on through a forty-thousandth SFIOI memory 5561-40k. The status memory 5562 is shown to include a first status memory 5562-1, a second status memory 5562-2, and so on through a forty-thousandth status memory 5562-3. Each processor, core or thread performs a specific process on SFIOIs in the SFIOI memory 5561, after first checking the corresponding status in the status memory 5562 and before updating the corresponding status in the status memory 5562. As noted, a security gateway system 156 according to the present disclosure is expected to handle voluminous SFIOIs, such as 40,000 per minute or even more. Thus, the SFIOI memory 5561 may be a first bay in the security gateway system 156 and may be assigned incoming SFIOIs for a minute as an example. A second bay in the security gateway system 156 may be substantially identical to the first bay, and may be assigned incoming SFIOIs for the next minute in this example timing. The cycling through bays may be performed periodically, such as every 5, 10, 15, 30 or 60 minutes. Moreover, while a bay may be assigned SFIOS for processing on a fixed timeframe, this is not particularly likely to be the best practice. Rather, load balancing and other types of practices may be implemented on a dynamic basis so that the SFIOI memories and status memories may be reinforced with additional physical resources when appropriate.

As should be clear, in FIG. 5A and FIG. 5B, a status memory 5562 is physically separate from a SFIOI memory 5561, such that a processor, core or thread switches back and forth between the two in processing. However, individual processors, cores or threads operate by processing only specific portions of a SFIOI rather than the entirety of the SFIOI in the SFIOI memory 5561, and by checking and writing to only individual bytes or words in the status memory 5562

Figure 5C:

In the memory arrangement for a security gateway system that processes a received SFIOI in FIG. 5C, memory management involves using a combined SFIOI and status memory 5563 for the memory space for SFIOIs and the memory space for statuses at a security gateway system 156. In other words, the combined SFIOI and status memory 5563 includes a first area for storing the SFIOI and a second area used for tracking the status of processing of the SFIOI. 256 bytes of a page may be reserved for specific use in processing by processors, cores, or threads of the security gateway system 156. For example, if a 512-byte page can store up to 64 64-bit words and 32 of the 64-bit words are reserved for the SFIOI, then memory starting at the 33rd word line of the combined SFIOI and status memory 5563 may be used for statuses. Statuses may be updated by writing at a bit level, at a byte level or at a word level. For example, the default statuses in the status space may be set to 0 (zero), and may be updated to 1 (one) in a status update, so that bytes or words in the status spaces in the combined SFIOI and status memory 5563 may be written to 1 at one or more bit positions when the corresponding processing is complete. Therefore, during processing of a SFIOI, a processor, core or thread may read statuses at or after the 33rd word line of the combined SFIOI and status memory 5563 before processing a specific part of the SFIOI and then updating another part of the status space. The processors, cores or threads may be organized to efficiently use the memory pages of the security gateway system 156 so that each single physical memory page is logically partitioned. Of course, the partition does not have do be exactly one-half of the total space of a memory page or other predefined addressable memory unit.

Figure 5D:
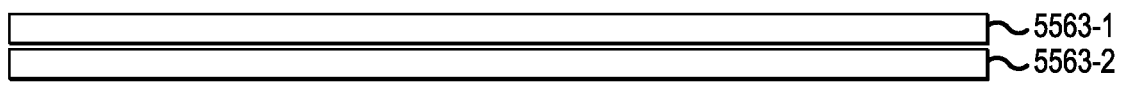
Figure 5D:

In the memory arrangement for a security gateway system that processes a received SFIOI in FIG. 5D, a combined SFIOI and status memory 5563 is shown to include a first portion 5563-1, a second portion 5563-2 and so on up to a forty thousandth portion 5563-40k. Of course, a bay of a security gateway system 156 is not limited to sections of 40,000 pages or other units of memory, and is not limited to switching to new bays every minute or every 40,000 SFIOIs. Rather, one of ordinary skill in the numerous technological arts required to implement a CS with a security gateway system 156 described herein will recognize that the numbers are only examples, though the efficient use of memory in units used at the time of implementation (e.g., pages of 512 bytes) will certainly provide for efficient processing in a variety of ways. The most efficient way to perform this processing may be to use predefined memory units that are as large or larger than the size of each SFIOI and that provides whatever memory space is required for the status updates for each SFIOI. This way, SFIOIs may be stored on a 1-to-1 basis in a predefined and addressable memory space.

Figures 6, 7A, 7B:
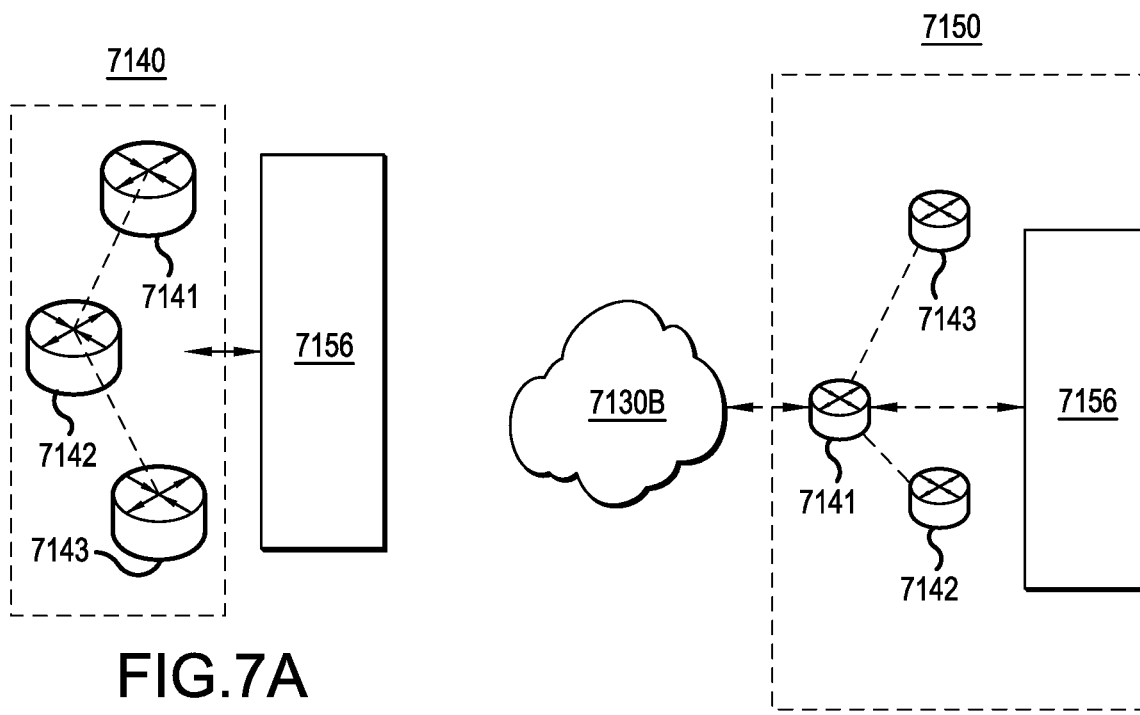
FIG. 6 illustrates an example format for a SFIOI.
FIG. 7A and FIG. 7B illustrate arrangements of internet network routers.

FIG. 6 illustrates an example format for a SFIOI. Formats for SFIOIs may be one of the most important aspects of implementing an NDC safely. For example, a security gateway system 156 may only execute instructions or response to inquiries in SFIOIs that comply with a required format, and reject any other type of incoming packets.

In FIG. 6, a header for an IP packet includes 24 bytes, or the equivalent of 3 64-bit/8-byte words. A header for an IPv4 packet normally is assigned 20 bytes, so the last 4 bytes may be null values in the format. A header for an IPv6 packet normally is assigned 40 bytes given a larger IP addressing scheme. In FIG. 6, the first field after the header is for a VN count which is provided 8 bytes/64-bits even though the VN count may require only a few bits if the maximum number of VN fields in the format is limited to something like 7, 13, 19 or another small number. The VN count may be processed to ensure that the substantive data of the IP packet ends where it should according to the number of VNs specified in the VN count. Next, a first party ID field and a second party ID field are each provided with 8 bytes/64-bits. In this way, each of the first party ID field and the second party ID field may be read as entire words, even if the first party ID and the second party ID are less than 64 bits of substantive data. In FIG. 6, sixteen separate fields are each provided as full words to specify sixteen VNs. Each thread assigned to perform security checks for the VNs may read the corresponding unique identifications for the VNs as entire words, even if the unique ID for each VN is less than 64 bits of substantive data. However, most or all of the allocated VN fields may include substantive data. For example, unique IDs for VNs may include a first byte for country/region code, a second byte for denomination, and six more bytes for the actual unique ID. The last substantive field is for a type of the SFIOI, since the type of inquiry or instruction specified in the SFIOI is only processed if the SFIOI passes the preliminary security processing.

The final fields of the SFIOI format in FIG. 6 are empty, and are reserved for the status updates at the security gateway system 156. Two words of 16 bytes total may be enough to track statuses of 16 security checks with a different byte for each security check, three words of 24 bytes total may be enough to track statuses of 24 security checks, and so on. By keeping the number of allowed unique IDs for VNs in a packet at or under a an appropriate limit, even a 256-byte format for a SFIOI may be enough to handle processing at the security gateway system 156, though the present disclosure primarily uses the example of a 512-byte format. A format for SFIOIs may be matched to sizes of memory units other than flash memory pages.

The first party ID field may include requester_ID. The second party ID field may include a counterparty_ID. The VN ID fields may include VN_info for each VN specified by a unique ID. Although not shown in FIG. 6, a format may include a notifier-type field which may indicate whether the notification is being made by a transaction requester or a transaction counterparty. Notifier_type may also indicate whether the notifier is a trusted system.

SFIOI formats may specify that 8 bytes are allowed in a 512 byte packet for each party identification. The party identifications may be formatted to implicitly specify which nation or region is the source of each of the party identifications, so that a single party identification can be used for NDCs tracked by different CSs. Bits or entire bytes may also be dedicated to specifying banks or similar entities through which end users obtained the unique identifications, so that the identification of the end users may be retained by the banks or similar entities without requiring a complete profile to be managed by the CS 150.

Example of types of SFIOIs formats may allow parties:
to inquire whether a counterparty owns a VN
to instruct a transfer of ownership of a VN to a counterparty
to instruct for subsequent special handling or revocation of special handling
to instruct that a VN has been lost or stolen
to provide a metadata status update for a VN which has not been transferred recently In some embodiments, another field for a SFIOI may also specify the total amount involved in a transaction, the amount of change (i.e., less than a $1.00 amount) involved in a transaction, or another amount. For example, in the event that small denominations are not issued for VNs or are otherwise not tracked by a CS, a SFIOI may still specify the amount of change to be credited and/or debited from accounts corresponding to the parties, depending on whether the SFIOI is specifying a transfer in a transaction. In this way, the format for SFIOIs may still accommodate transfers involving denominations which are not issued as VNs, or which are not otherwise tracked by the CS. Parties registered to use the VNs of a currency may have a credit account, checking account, or savings account associated with their unique identification. In this way, amounts less than, for example $1.00, may be credited to or debited from the associated account. As an example, if a party is paying $50.00 for an item in a transaction and expects 65 cents in change, the change may be automatically credited to the party's associated account and debited from the seller's associated account. The associated accounts may be maintained outside of the CS, so that the associated accounts are maintained by the financial institutions which provide the accounts as a service. The CS may simply notify the ID management system 151 or another node which maintains ID records for parties to initiate a debit or credit with the financial institutions. In some embodiments, parties registered with a CS may be required to have an associated account, though a government and/or central bank may facilitate accounts (e.g., by providing incentives to financial institutions) for the segments of populations who do not already have such accounts.

In some embodiments, a VN format may provide for variable denominations, as described in a Federal Reserve technical proposal published in February, 2022. A denomination field that is used to specify fixed denominations may also specify a type that indicates a variable denomination, and this may serve as an alternative to specifying an amount of change.

So long as VNs are provided with unique identifications, the format of a SFIOI may be used to track the VNs. Thus, VNs may be full data sets with image data, partial data sets with logical data that is supplemented with templates when visualization of the VNs is requested, encrypted data sets such as cryptocurrencies, or any other types of data sets, so long as the VNs are provided with unique identifications that can be used for tracking purposes.

Financial institutions and other types of organizations may also be provided an ability to issue the party IDs described herein. For example, a financial institution may be provided a unique identification with 4 or 5 digits, such that the unique identification can be stated in two or three bytes. The financial institution may use its unique identification as the first two or three bytes of a full identification assigned as a party ID. Party IDs may then be something like three bytes, four bytes or five bytes for the party and two or three bytes for the financial institution. In this way, the CSs may not be required to store any identifying information of a party, and instead may rely on the financial institutions to know who the party IDs correspond to. At least in the U.S., financial institutions may store party IDs and then simply require a warrant in the event that a governmental entity wants to know who the party ID corresponds to. Other types of organizations that may be allowed to issue unique identifications for customers may include entities such as Coinbase, Facebook, or other entities with large customer bases, so long as the customer bases include customers who actually trust such entities to maintain their privacy to the extent possible or even just reasonable. As an example, a CS may provide a unique ID for a party to a bank, and let the bank determine which party will be assigned the unique ID.

In some embodiments, parties may be provided an ability to automatically deposit VNs into an associated account when received, such as when received from a stranger. As a safety aspect, since the strangers may have knowledge of which VNs were just transferred to a party, the ability to automatically or at least quickly transfer the VNs to an associated account may help thwart potential spoofing attempts by the strangers. Additionally, when VNs are transferred to a financial institution for deposit into an associated account, the financial institution may simply retain the VNs and issue a credit as an update to a ledger balance for the party, so that the party can begin collecting interest. In some embodiments, party IDs may be used to track cashier's checks, travelers checks, stablecoins and other fixed-denominations representations of an underling national currency, as long as they are uniquely identified.

A type for a SFIOI may be specified in a field required in the format for the SFIOI, such as a field of a full byte or even 2 or 3 bits. Because the tracking described herein may be expanded to many other uses, a type field may include a full byte so that up to 256 different types may eventually be specified using the same format, even though one or relatively few types are used for the NDC tracking described herein.

In the arrangement of internet network routers in FIG. 7A, a system of network routers limits communications to the CS 150 to non-sequenced packets (i.e., single-packet) SFIOIs sent as UDP/IP packets (or nonsequential TCP/IP packets). The system of network routers in FIG. 7A may be expanded to a variety of uses. For example, the example format for SFIOIs described herein may be adapted for all sorts of other uses, such as to send single-packet requests for a server to initiate a communications connection with a requesting device in a context where an entity wishes to prohibit the server from receiving connection requests. Other examples include tracking real property, loans, and more. As shown in and described with respect to FIG. 7A, FIG. 7B, FIG. 7C, FIG. 7D and FIG. 7E, and FIG. 7F, packets for an SFIOI may be subject to other basic safety checks before reaching the security gateway system 156.

Other basic safety requirements may be implemented within the internet such as at the edge of the internet closest to the security gateway system 156. For example, one or more network routers in the internet provided by a network service provider may be configured and programmed to ensure that packets addressed to an IP address corresponding to the CSs described herein are exactly 512 bytes, and/or are nonsequential UDP/IP packets or nonsequential TCIP/IP packets and not sequential TCP/IP packets. Alternatively, these checks may be provided after processing by the last internet router in the internet and before the packets arrive at the security gateway system 156. For example, a modified safety system based on an internet router may intercept packets being sent to one or more specific IP addresses and perform one or more preliminary checks such as compliance with an exact size requirement, a ban on TCP/IP packets and so on. On the one hand, these preliminary checks will delay processing at the modified safety system since each check essentially multiplies the original basic processing requirement for an internet router (i.e., to check the destination IP address and route packets according to a routing table). On the other hand, modern high-end internet routers process enormous amounts of packets per second or minute, at a volume similar or greater to that expected for the CS 150. Accordingly, one or very few modified safety systems based on modifications to high-end internet routers may perform one or more of the most basic safety checks before packets ever reach the security gateway system 156. This may be useful in fending off DOS attacks, especially if the number of modified safety systems can be dynamically expanded when DOS attacks are expected in order to help minimize disruptions to the CS 150.

A modified network router or switch may use DDR4 random access memory (RAM) rather than flash memory to temporarily store packets as they are processed. For example, packets may be stored in a DDR 4 RAM, then the destination IP address may be read and compared to a routing table, and if the routing table is modified to indicate that packets to the destination IP address are to be subject to a preliminary safety check, then perform the preliminary safety check. Safety checks at a modified router or switch may be very basic, such as confirmation that packets are a specific size or below a threshold, or that packets are sent by UDP, or non-sequenced TCP. In other embodiments, most routers at a network service provider may be configured to simply send packets addressed to specific destination IP addresses to a service node that performs the safety checks and then passes the packets along to the specific destination IP addresses. The service node may include one or more modified routers, or another form of high-speed processing environment, that adds one or very few safety checks for packets addressed to specific IP addresses that require packets to meet expected formatting requirements. For example, a service node may be provided as an independent service, analogous to a picket system that filters packets to one or more destinations that require packets comply with specific formats such as 512-byte formats.

Additionally, while one or a few network routers may be specifically programmed to perform the packet checks within the internet because the one or few network routers are in the network closest (logically and/or physically) to the security gateway system 156, additional network routers may be configured to be dynamically adjusted to implement the packet checks when instructed, such as if the network service provider detects that the IP address for the security gateway system 156 is subject to a denial of service attack. For example, the default setting may be that the basic safety requirements are performed by 3 of the network routers in the network closest (logically and/or physically) to the security gateway system 156, but when a DOS attack is detected, the next 9, or 27, or 97 closest network routers may be dynamically adjusted to start detecting and deleting packets addressed to the IP address that are too big or too small or the wrong type.

Additionally or alternatively, one or more additional network routers may be maintained out of service within or immediately outside of the CSs, and dynamically brought into service to begin assisting with the basic safety checks for packet size and type when a DOS attack is detected. The additional network routers may be inserted between the security gateway system 156 and the internet, and configured to be dynamically started and implement the packet checks when instructed. For example, the default setting may be that the basic safety requirements are performed by 3 of the network routers in the network closest (logically and/or physically) to the security gateway system 156, but when a DOS attack is detected, an additional 3, or 27, or 97 additional network routers may be dynamically spun up and allocated traffic headed to the security gateway system 156 to start detecting and deleting packets addressed to the IP address that are too big or too small or the wrong type.

In FIG. 7A, a specialty ISP 7140 is a specialty internet service provider. For example, a government or private industry may wish to stand up the specialty ISP 7140 for the last-mile routing to a CS that provides the security gateway system 7156. The specialty ISP 7140 may also provide specialized packet routing for one or more other service providers, CSs, and so on.

In FIG. 7A, the specialty ISP 7140 includes a first internet network router 7141, a second internet network router 7142, and a third internet network router 7143. Each of the internet network routers in FIG. 7A may be configured to perform one or more safety checks on packets addressed to one or more predetermined internet protocol addresses. The one or more safety checks are in addition to the core functionality of the internet network routers, which is routing packets at extraordinarily high speeds. Accordingly, the imposition of safety checks for packets addressed to the one or more predetermined internet protocols will slow the routing of packets handled by the specialty ISP 7140 compared to other internet traffic.

A variety of logical configurations may be used to allow the internet network routers to operate normally for some or even most traffic. For example, internet protocol addresses handled by the internet network routers as last-mile destination services may be bunched up, so that one internet network server maintains a list of such internet protocol addresses for which special safety procedures will be implemented. In other words, an internet network router in FIG. 7A may be specially designated to implement one or more safety checks on traffic to one or more internet protocol addresses for which the internet network router is the last-mile router. Additionally, in the event of a denial of service (DOS) attack, the one internet network router may request assistance so that one or both of the other internet network routers begin processing traffic and implement the same safety checks for the same one or more internet protocol addresses which receive the special handling. There is no requirement for a maximum or minimum number of internet network routers which can be used to implement one or more safety procedures as a default. Nor is there any requirement for back-up internet network routers which can be dynamically brought in to implement the one or more safety procedures in the event of a DOS attack.

In the arrangement of internet network routers in FIG. 7B, the internet network routers from FIG. 7A are provided in the CS 7150, so that the internet network routers are recipients of traffic to one or more internet protocol addresses at the CS 7150. The internet network routers in FIG. 7B are dedicated to the CS 7150, so do not provide routing services for third-party internet protocol addresses. In FIG. 7B, a single internet network router may be assigned to implement one or more safety checks, and the other two internet network routers may be dynamically activated or brought in to handle traffic and implement the safety check(s) when a DOS attack is detected.

In some embodiments based on FIG. 7A and FIG. 7B, two or more internet network routers may be provided in a chain, where each of the two or more internet network routers implements a different safety check. For example, a first internet network router may check the size of each packet for a listed internet protocol address and delete packets that are more or less than 512 bytes, or outside of a range that includes 512 bytes, A second internet network router may check the header of each packet for the listed protocol address, and ensure the packet is transmitted according to UDP/IP and not TCP/IP. In this way, packets may be processed by multiple of the internet network routers and subject to different basic safety checks at each, so that the burden on the security gateway system 7156 is reduced.

In some embodiments based on FIG. 7A and FIG. 7B, a separate controller (not shown) may coordinate the internet network routers, such as to increase the number of internet network servers handling traffic to a particular internet protocol address and implementing safety checks when a DOS attack is detected. The separate controller may be configured to monitor a set of internet network routers, and may otherwise be disconnected from the internet or the public entirely. The number of internet network routers which can be brought in to handle increased traffic in a DOS attack is not limited to 2, and instead may be any number such as 27, 97 or 997 of the internet network routers logically and/or physically closest to the targeted internet protocol address. Additionally, the internet network routers are not necessarily called up all at the same time, and instead may be activated in stages. For example, at a first stage, two internet network routers may be assigned to help with the safety checks for a targeted internet protocol address, and in a second stage, eight additional internet network routers may be assigned to help with the safety checks for a targeted internet protocol address.

Based on the embodiments of FIG. 7A, the specialty ISP 7140 may offer safety services for specialty internet protocol addresses. Although the safety checks are designed initially for traffic relating to an NDC and headed to a CS 150, the specialty ISP 7140 may provide similar services to one or more other government or private sector providers. In other words, the specialty ISP 7140 may provide safety services as a stand-alone service, not limited to the CS 7150.

Figure 7C:
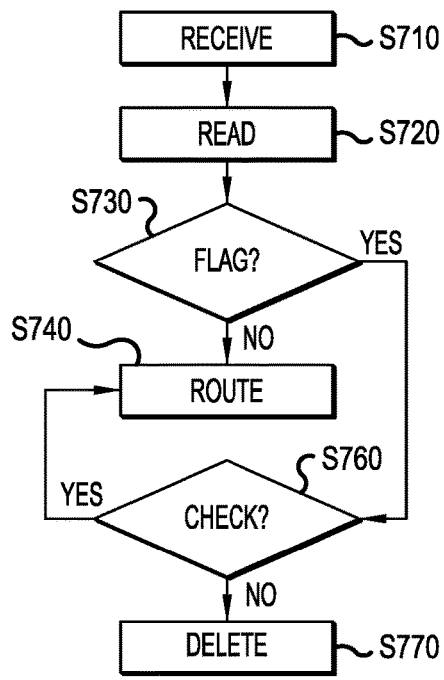
FIG. 7C illustrates a method for filtering packets before they reach an internet protocol destination address.

In the method for filtering packets before they reach an internet protocol destination address in FIG. 7C, a packet is received at S710, and the destination internet protocol address (destination IP) and routing policy are read at S720. A determination is made whether the destination IP is flagged at S730, such as if the destination IP specifically mentioned on a routing table or is part of a group of internet protocol addresses that are subject to special handling which is flagged at the routing table. If the packet is not flagged (S730=No), the packet is routed as normal at S740. If the packet is flagged (S730=Yes), the format parameter which is to be checked is checked at S760. If the packet if compliant (S760=Yes), the packet is routed as normal at S740. If the packet is not compliant (S760=No), the packet is deleted at S770. The method of FIG. 7C may be performed by a modified safety system in the internet network. A modified safety system may be a modified router or switch, which is simply modified to check one or more parameters of packets headed to destination IPs flagged in a routing table. Any such router or switch should be placed as the most logically and/or physically proximate, or among the most logically and/or physically proximate, routers or switches relative to the destination IP in the internet network.

Figure 7D:
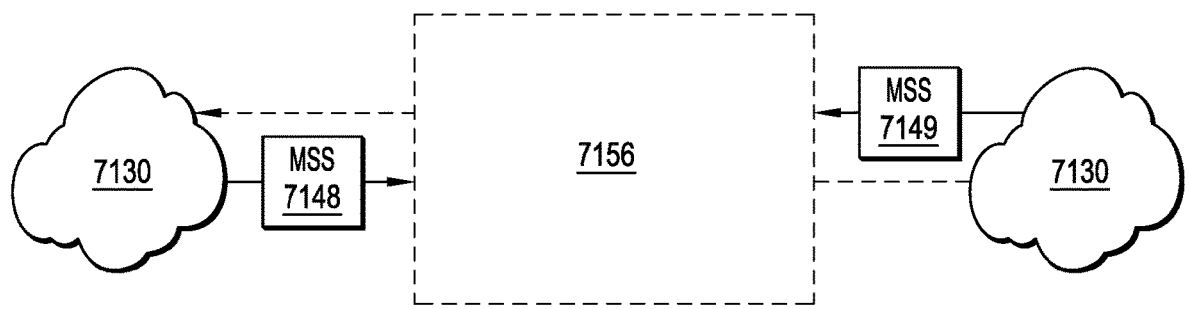
FIG. 7D illustrates a communication system for filtering packets before they reach an internet protocol destination address.

In the communication system for filtering packets before they reach an internet protocol destination address at a security gateway system in FIG. 7D, a first modified safety system is shown as MSS 7148, and a second modified safety system is shown as MSS 7149. MSS 7148 and MSS 7149 may perform safety checks of the type described in the method of FIG. 7C. MSS 7148 and MSS 7149 may be in the internet network, such as in a specialty internet service provider network. Alternatively, MSS 7148 and MSS 7149 may be provided as a dedicated picket system for the CS described herein. In other embodiments, MSS 7148 and MSS 7149 may be provided as a dedicated picket system for a group of end user systems such as the CS described herein, as well as other organizations which may benefit from the safety checks performed on specific packets before the reach the destination IP addresses they are addressed to.

Figure 7E:
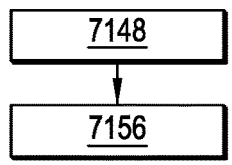
FIG. 7E and FIG. 7F illustrate methods for distributing safety checks for packets addressed to an internet protocol destination address at a security gateway system.

In the method for distributing safety checks for packets addressed to an internet protocol destination address at a security gateway system in FIG. 7E, the first MSS 7148 performs a method that includes demodulating a first signal which is received, storing packets from the demodulated signal in registers, checking the size of the packets, modulating the packets in a second signal, and forwarding the packets via the second signal when they meet the size requirements for their destination IP addresses. A security gateway system 7156 at a CS 7150 performs a method that includes demodulating the second signal, storing packets from the demodulated signal in flash memory such as on a 1-to-1 basis, and executing safety sub-programs to ensure that packets meet the expected format and safety controls implemented at the security gateway system 7156.

Figure 7F:
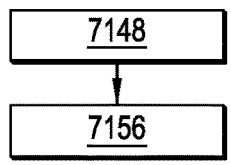

In the method for distributing safety checks for packets addressed to an internet protocol destination address at a security gateway system in FIG. 7F, the first MSS 7148 performs a method that includes demodulating a first signal which is received, storing packets from the demodulated signal in registers, checking header information from the packets, modulating the packets in a second signal, and forwarding the packets via the second signal when the header information from the packets meet the requirements for their destination IP addresses. A security gateway system 7156 at a CS 7150 again performs a method that includes demodulating the second signal, storing packets from the demodulated signal in flash memory such as on a 1-to-1 basis, and executing safety sub-programs to ensure that packets meet the expected format and safety controls implemented at the security gateway system 7156.

There are many example use cases of how the technologies described herein can be used to implement an NDC safely. One example of a safety concern addressed herein is when exchanging a VN for another VN leaves an opening for the originator or a confederate of the originator to spoof the recipient party and instruct a CS via a SFIOI to change the ownership of the VN back to the originator or a confederate.

As described herein, the CSs described herein may initiate an anti-spoofing (e.g., multi-factor) communication to an address of record for the recipient. Additionally, the recipient may automatically exchange VNs from strangers with CSs to avoid this scenario, or provide new VNs to a financial institution in exchange for a credit in an account at the financial institution, such as by depositing the VN in a checking account (as modified for VNs) or a savings account. Low denomination VNs may also be consolidated for VNs from the CS with a higher denomination. These and other mechanisms are enabled by the teachings herein, and may be used to safely avoid any, or almost any, forms of misconduct which are not safely provided by technology today. As one example, tracking of the VNs at the CSs described herein may allow parties to transfer VNs quickly to their financial institutions so that previous owners cannot fraudulently impersonate the owners in order to regain control of the VNs.

In another use case, when a counterparty proactively sends a unique identification for a VN offered from a party initiating a transaction to a CS, the unique identification may be encrypted in the SFIOI. The unique identification may be decryptable only by the CS, so the CS can respond to the counterparty and indicate whether the VN belongs to the party initiating the transaction, and can confirm the denomination of the unique identification. This may occur without the counterparty having the underling unique identification, so that until a transaction occurs, the counterparty is prevented from possessing the unique identification of the VN offered for payment. Thus, both the unencrypted unique identification and the encrypted unique identification may be provided with the VN so that the unencrypted version can be sent ahead for authentication before a counterparty accepts the VN for payment in a transaction.

Additionally, the use of encryption mechanisms such as SSL may be assumed for transmission of VNs in many communications. To the extent that different mechanisms for encryption may be used for handling of VNs, the teachings herein should not be considered particularly inconsistent with use of any particular encryption in appropriate circumstances.

Although security mechanisms for digital currencies has been described with respect to VNs, the teachings herein are not limited in applicability to VNs or any particular NDC authorized by a government or issued by or on behalf of a central bank. Rather, various aspects of the teachings herein may be implemented for other forms digital currencies including stablecoins and other forms of cryptocurrencies, as well as other forms of digital tokens that are used as mediums of value, including digital currencies that do not share one or more characteristics of VNs as described herein.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A centralized tracking system, comprising:
   a security gateway system that interfaces with the public over the internet, that comprises a memory that stores packets received over the internet and a processor that executes a plurality of algorithms to impose safety checks on the packets, wherein the packets are required to conform to a predefined format that specifies requirements for fields at predetermined relative locations of payloads of acceptable packets, and each algorithm processes packets by checking data in the fields at the predetermine relative location of the payloads of the packets for compliance with the predefined format, wherein packets are individually stored in memory units of a same size at the security gateway system, and wherein the plurality of algorithms are each implemented by a different thread and each imposes at least one safety check on the data of each packet processed by the thread until each packet processed by the thread either passes all required safety checks, or until each packet processed by the thread fails any safety check and processing of the packet by the thread is deemed complete; and a main memory system that is shielded from the public by the security gateway system, that stores records for all instances of a tracked digital asset for the centralized tracking system, and that receives updates to the records once instructions from the public pass the safety checks.

2. The centralized tracking system of claim 1, further comprising:

a ledger storage system that is physically remote from the main memory system, that is shielded from the public by the security gateway system, that stores records of current ownership of instances of the tracked digital asset, and that confirms whether ownership listed in packets is correct for at least one tracked digital asset listed in the packets.

3. The security gateway system of claim 2, wherein the plurality of algorithms at the security gateway system send packets to the ledger storage system for ownership inquiries.

4. The centralized tracking system of claim 1, wherein the packets received at the security gateway system are pre-filtered to ensure compliance with the predefined format required for processing the packets at the centralized tracking system before the packets are received at the security gateway system, and wherein the packets received at the security gateway system are post-filtered by the plurality of algorithms to ensure compliance with the predefined format, and wherein at least one of pre-filtering before the security gateway system or post-filtering at the security gateway system includes a size check that ensures each packet conforms to a specific size required by the predefined format.

5. The centralized tracking system of claim 1, wherein the plurality of algorithms are executed in parallel to simultaneously process different packets.

6. The centralized tracking system of claim 1, wherein the packets are limited to individual, non-sequenced packets, and wherein each instance of the tracked digital asset is assigned a unique identification which is used to track the tracked digital asset.

7. The security gateway system of claim 1, wherein each algorithm of the plurality of algorithms is implemented by a different thread dedicated to the algorithm and executed on a multicore processor.

8. A method for centralized tracking, comprising:

interfacing a security gateway system with the public over the internet, wherein the security gateway system comprises a memory and a processor;

storing packets received over the internet in the memory, wherein packets are individually stored in memory units of a same size at the security gateway system, wherein the packets are required to conform to a predefined format that specifies requirements for fields at predetermined relative locations of payloads of acceptable packets, and each algorithm processes packets by checking data in the fields at the predetermined relative locations of the payloads of the packets for compliance with the predefined format;

executing a plurality of algorithms to impose safety checks on each packet received over the internet, wherein the plurality of algorithms are each implemented by a different thread and each imposes at least one safety check on the data of each packet processed by the thread until each packet processed by the thread either passes all required safety checks, or until each packet processed by the thread fails any safety check and processing of the packet by the thread is deemed complete;

shielding a main memory system from the public by the security gateway system;

storing records for all instances of a tracked digital asset for the centralized tracking system at the main memory system; and updating records at the main memory system when instructions from the public pass the safety checks.

9. The method of claim 8, further comprising:

refusing any connection request from the public at the security gateway system.

10. The method of claim 8, further comprising:

shielding a ledger storage system from the public by the security gateway system, wherein the ledger storage system is physically remote from the main memory system, stores records of current ownership of instances of the tracked digital asset and determines whether ownership listed in packets is correct for at least one tracked digital asset listed in the packets.

11. The method of claim 10, sending, by the plurality of algorithms at the security gateway system, packets to the ledger storage system for ownership inquiries.

12. The method of claim 8, wherein each packet received at the security gateway system is pre-filtered to ensure compliance with a predefined format required for processing packets at the centralized tracking system before the packets are received at the security gateway system, and wherein each packet received at the security gateway system is post-filtered by the plurality of algorithms to ensure compliance with the predefined format, and wherein at least one of pre-filtering before the security gateway system or post-filtering at the security gateway system includes a size check that ensures each packet conforms to a specific size required by the predefined format.

13. The method of claim 8, wherein the plurality of algorithms are executed in parallel to simultaneously process different packets.

14. The method of claim 8, wherein the packets are limited to individual, non-sequenced packets, and wherein each instance of the tracked digital asset is assigned a unique identification which is used to track the tracked digital asset.

15. The method of claim 8, wherein each algorithm of the plurality of algorithms is implemented by a different thread dedicated to the algorithm and executed on a multicore processor.

\* \* \* \* \*